United States Patent
Zhou et al.

(10) Patent No.: US 6,539,009 B1
(45) Date of Patent: Mar. 25, 2003

(54) SIGNAL RECEPTION APPARATUS FOR DS-CDMA CELLULAR SYSTEM

(75) Inventors: Changming Zhou, Tokyo (JP); Xuping Zhou, Tokyo (JP); Mamoru Sawahashi, Kanagawa (JP); Fumiyuki Adachi, Kanagawa (JP)

(73) Assignees: Yozan, Inc., Tokyo (JP); NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 09/195,162

(22) Filed: Nov. 18, 1998

(30) Foreign Application Priority Data

| Dec. 26, 1997 | (JP) | 9-367663 |
| Feb. 5, 1998 | (JP) | 10-039746 |
| Feb. 18, 1998 | (JP) | 10-054490 |

(51) Int. Cl.[7] .................... H04B 1/707; H04J 13/04
(52) U.S. Cl. ................. 370/342; 375/152; 375/147
(58) Field of Search ............... 370/335, 320, 370/324, 328, 334, 339, 342, 350, 487, 488, 490, 491, 500, 503, 508, 509, 519; 375/130, 136, 140, 142, 143, 147, 149, 150, 215, 152; 455/407, 408

(56) References Cited

U.S. PATENT DOCUMENTS

| 5,218,619 A | * | 6/1993 | Dent .................... 370/209 |
| 5,363,403 A | * | 11/1994 | Schilling et al. ........ 370/342 |
| 5,394,434 A | * | 2/1995 | Kawabe et al. ......... 370/342 |
| 5,467,368 A | * | 11/1995 | Takeuchi et al. ........ 370/335 |
| 5,579,304 A | * | 11/1996 | Sugimoto et al. ....... 370/342 |
| 5,652,748 A | * | 7/1997 | Jolma et al. ........... 370/320 |
| 5,737,327 A | * | 4/1998 | Ling et al. ............. 370/318 |
| 5,790,537 A | * | 8/1998 | Yoon et al. ............ 370/342 |
| 5,790,588 A | * | 8/1998 | Fukawa et al. ......... 370/342 |
| 5,872,808 A | * | 2/1999 | Davidovici et al. ..... 375/152 |
| 5,978,413 A | * | 11/1999 | Bender ................. 370/342 |
| 5,987,014 A | * | 11/1999 | Magill et al. .......... 370/335 |
| 6,108,317 A | * | 8/2000 | Jones et al. ........... 370/320 |

* cited by examiner

Primary Examiner—Wellington Chin
Assistant Examiner—William Schultz
(74) Attorney, Agent, or Firm—Armstrong, Westerman & Hattori, LLP

(57) ABSTRACT

A plurality of sets of spreading code sequences are stored in registers and selectively supplied to matched filters. The soft-handover, multi-code processing and long-delay paths can be processed by a small circuit.

16 Claims, 22 Drawing Sheets

US 6,539,009 B1

SIGNAL RECEPTION APPARATUS FOR DS-CDMA CELLULAR SYSTEM

DETAILED DESCRIPTION OF THE INVENTION

BACKGROUND OF THE INVENTION

1. Field of the Invention

The present invention relates to a signal reception apparatus for DS-CDMA cellular system having a sampling and holding circuit for holding analog input signal successively, a plurality of matched filters each for calculating a correlation between the input signal and a spreading code sequence and a plurality of calculation registers each corresponding to one of the matched filters for storing the spreading code sequence to be supplied to the corresponding matched filter.

2. Prior Art

The code division multiple access (CDMA) cellular system above is advantageous for an asynchronous system among base stations it is possible to identify the base stations and mobile stations and it is unnecessary to control the over a plurality of cells. The asynchronous system does not depend upon a time synchronization system, such as a global positioning system, so its base station can be established by a low cost. In the synchronous system, the base stations are identified according to the difference in time when signals from base stations reach to a mobile station. Since there are not defined any spreading codes for identifying the base stations, the base stations may be confused. While, the signal reception apparatus of the mobile station for asynchronous cellular system has a lot of performances, that is, a despread of a composite code of short and long codes, a fading compensation of a multi-path signal, a rake combining, the identification and evaluation of a plurality of base stations for an initial and peripheral cell search, changing of the transmission speed by variable spreading ratio and a multi-code communication for high speed communication. When a mobile station moves over a plurality of cells, base stations should be changed by soft-handover one after another.

Therefore, the signal reception apparatus for the CDMA cellular system may become complicated and large in circuit size. The signal reception apparatus is not preferable for a mobile station. If a long-delay path is to be processed, a plurality of matched filters are necessary in a traffic channel for one code sequence, so the circuit is further complicated. Also for the multi-code processing and soft-handover processing, a plurality of matched filters are necessary.

SUMMARY OF THE INVENTION

The present invention has an object to provide a signal reception apparatus for DS-CDMA cellular system of small size available for processing by a plurality of spreading code sequences.

According to the present invention, one or a plurality of matched filters are connected with a plurality of registers for storing a plurality of spreading code sequences through a multiplexer.

BRIEF DESCRIPTION OF THE INVENTION

Figure 1:
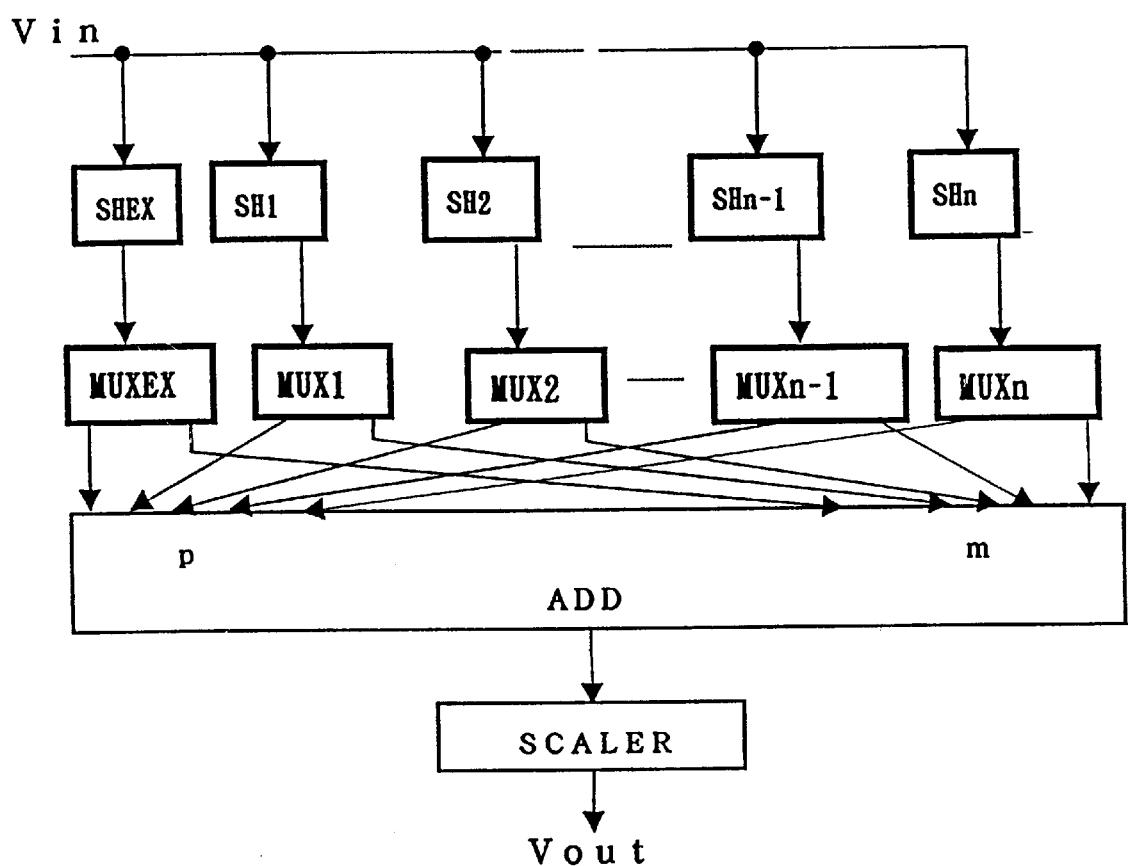
Figure 2:
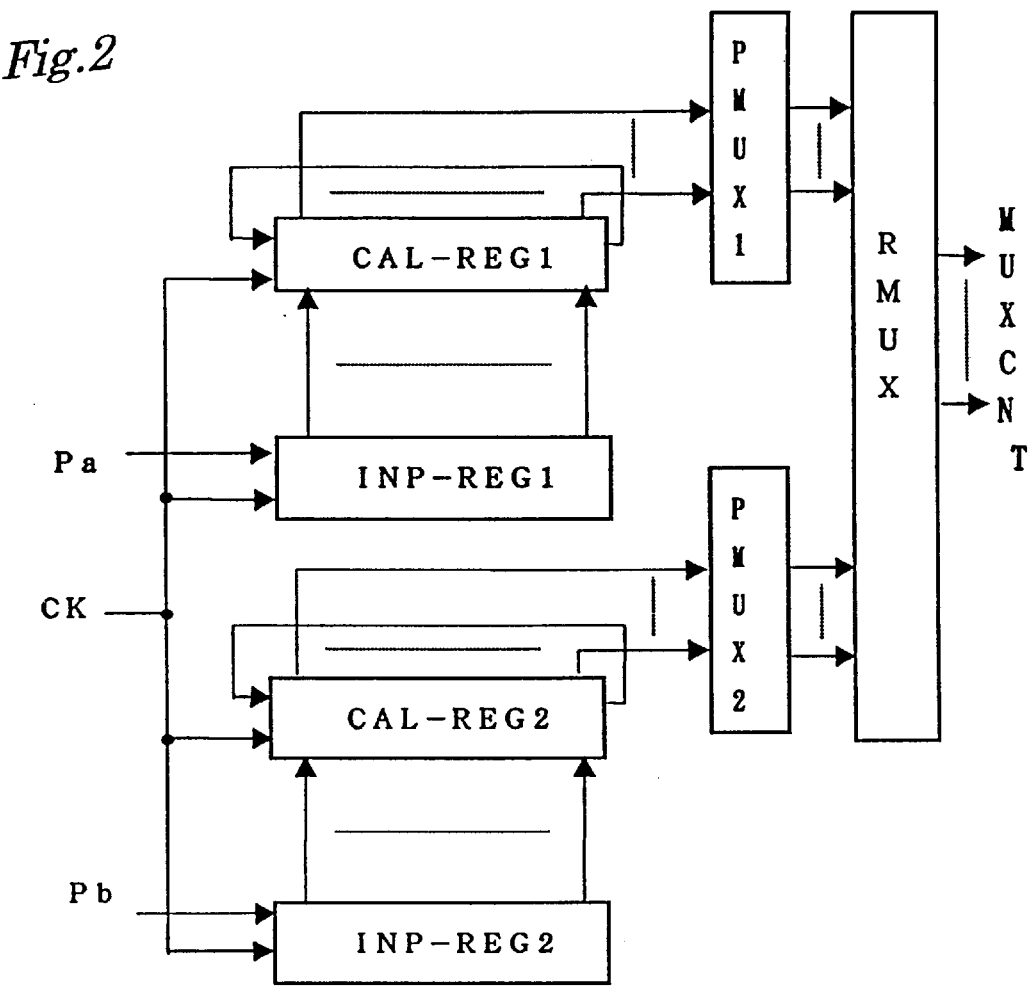
Figure 3:
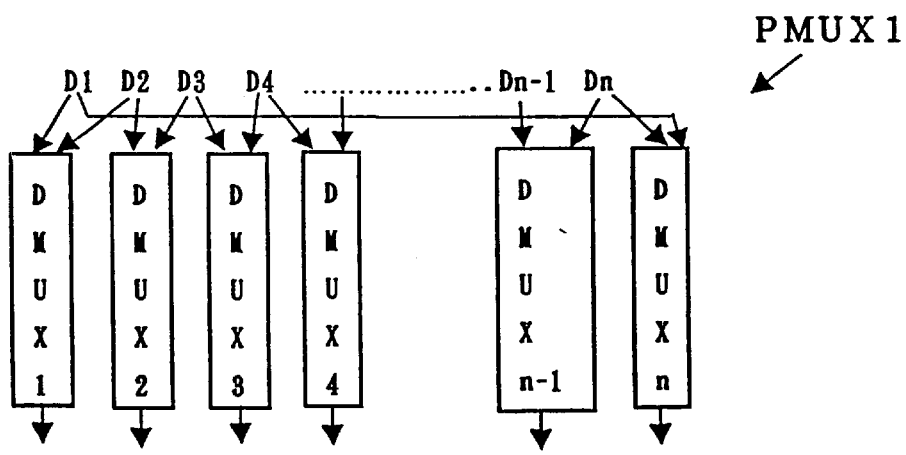
Figure 4:
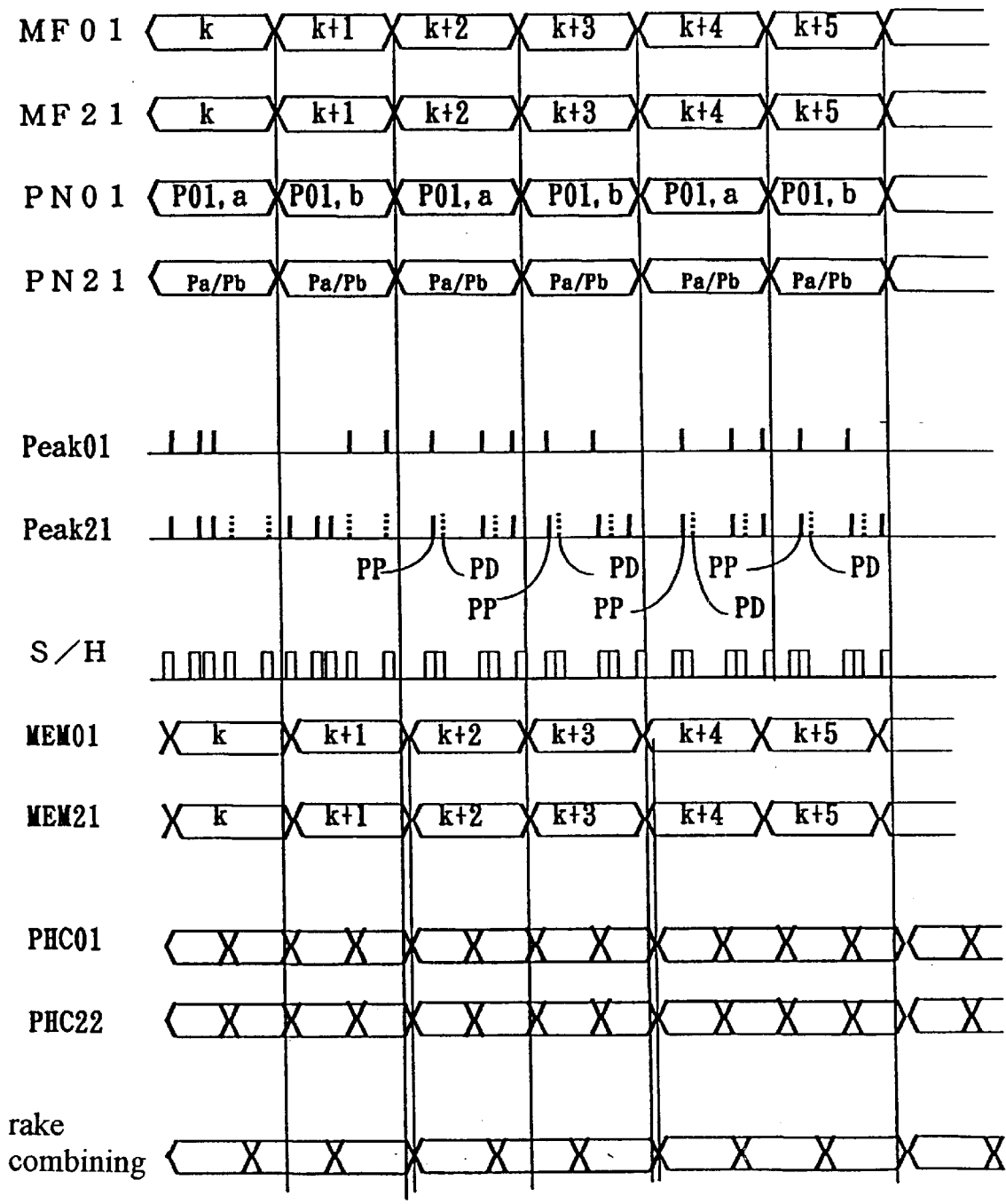
Figure 5:
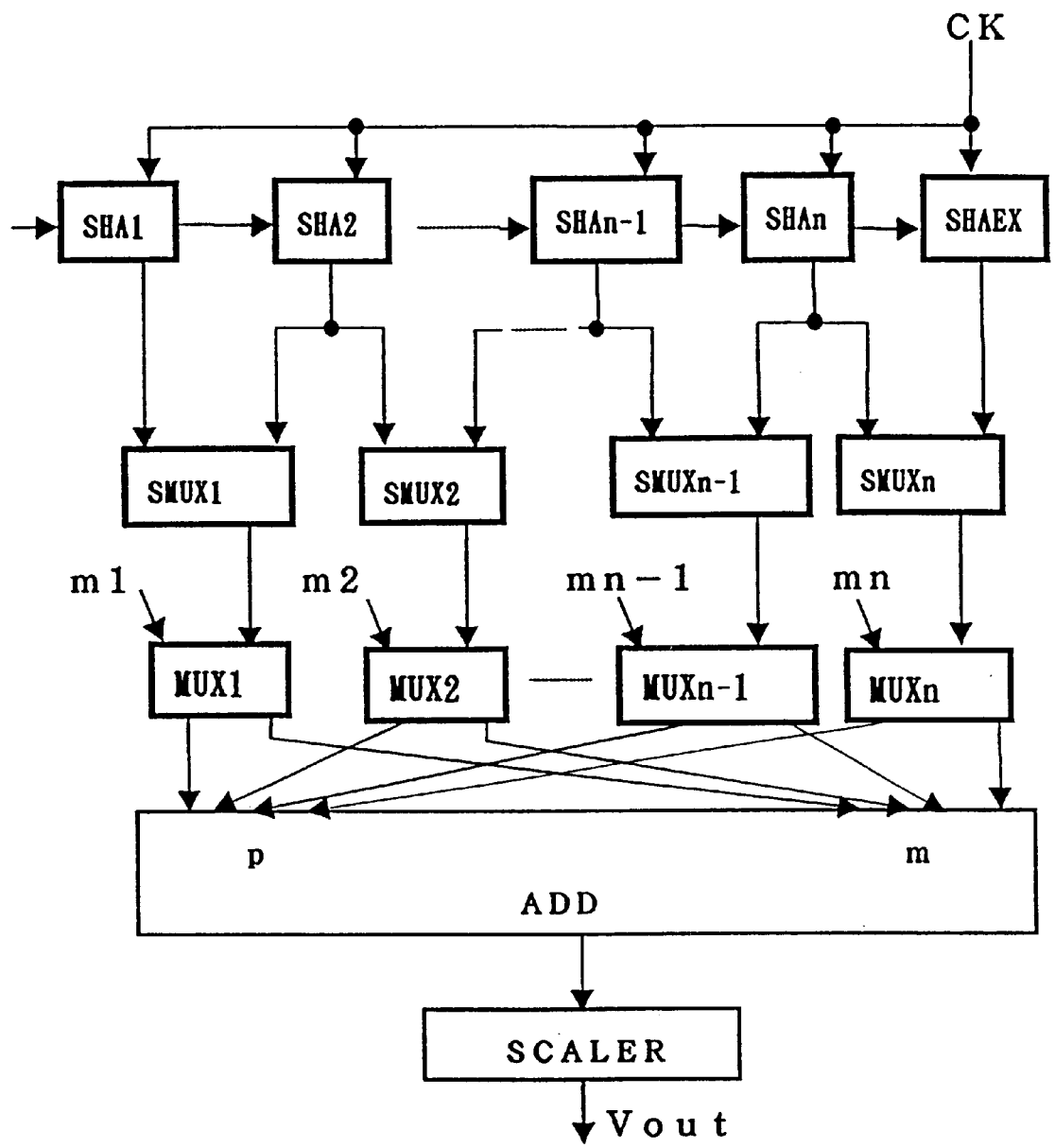
Figure 6:
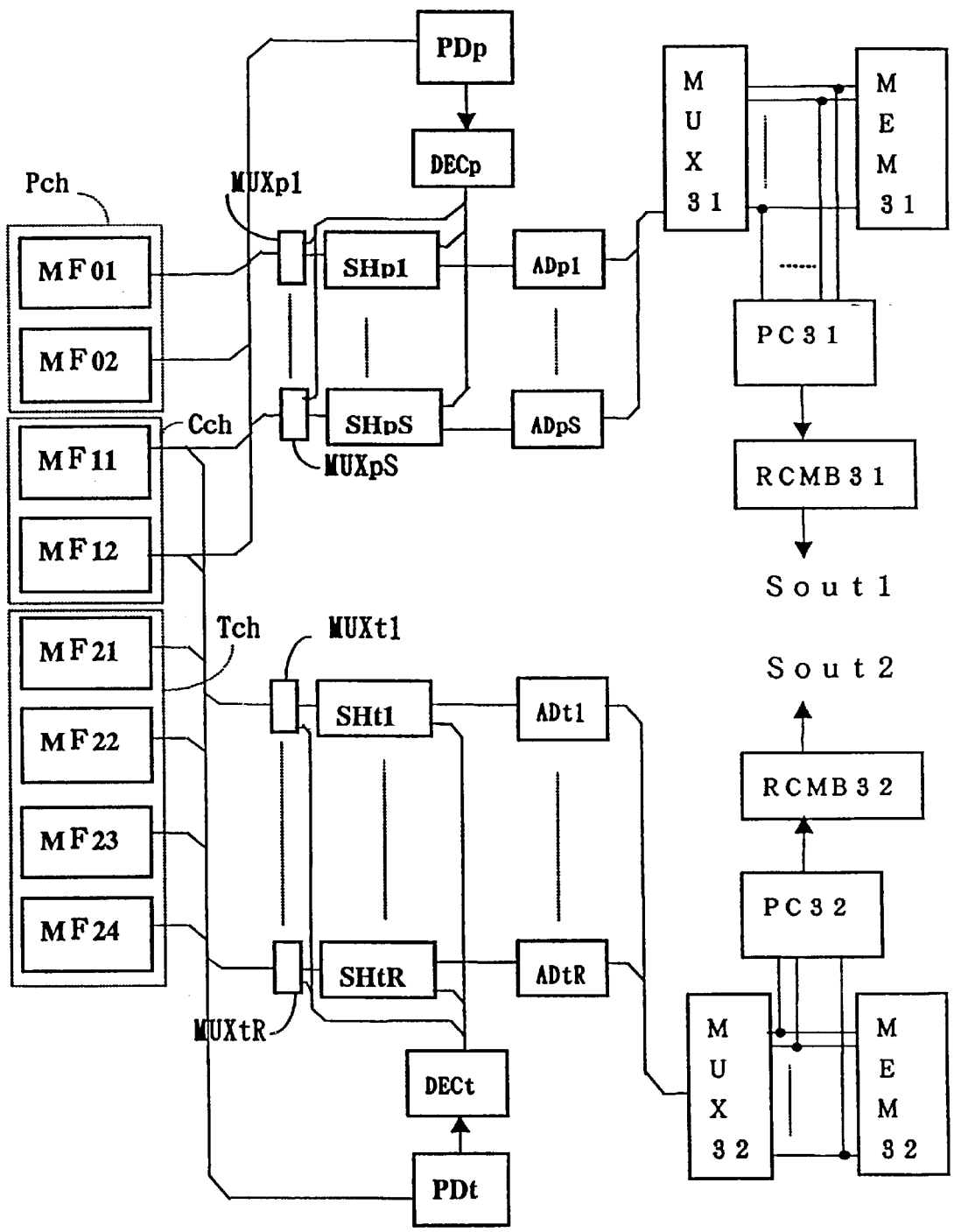
Figure 7:
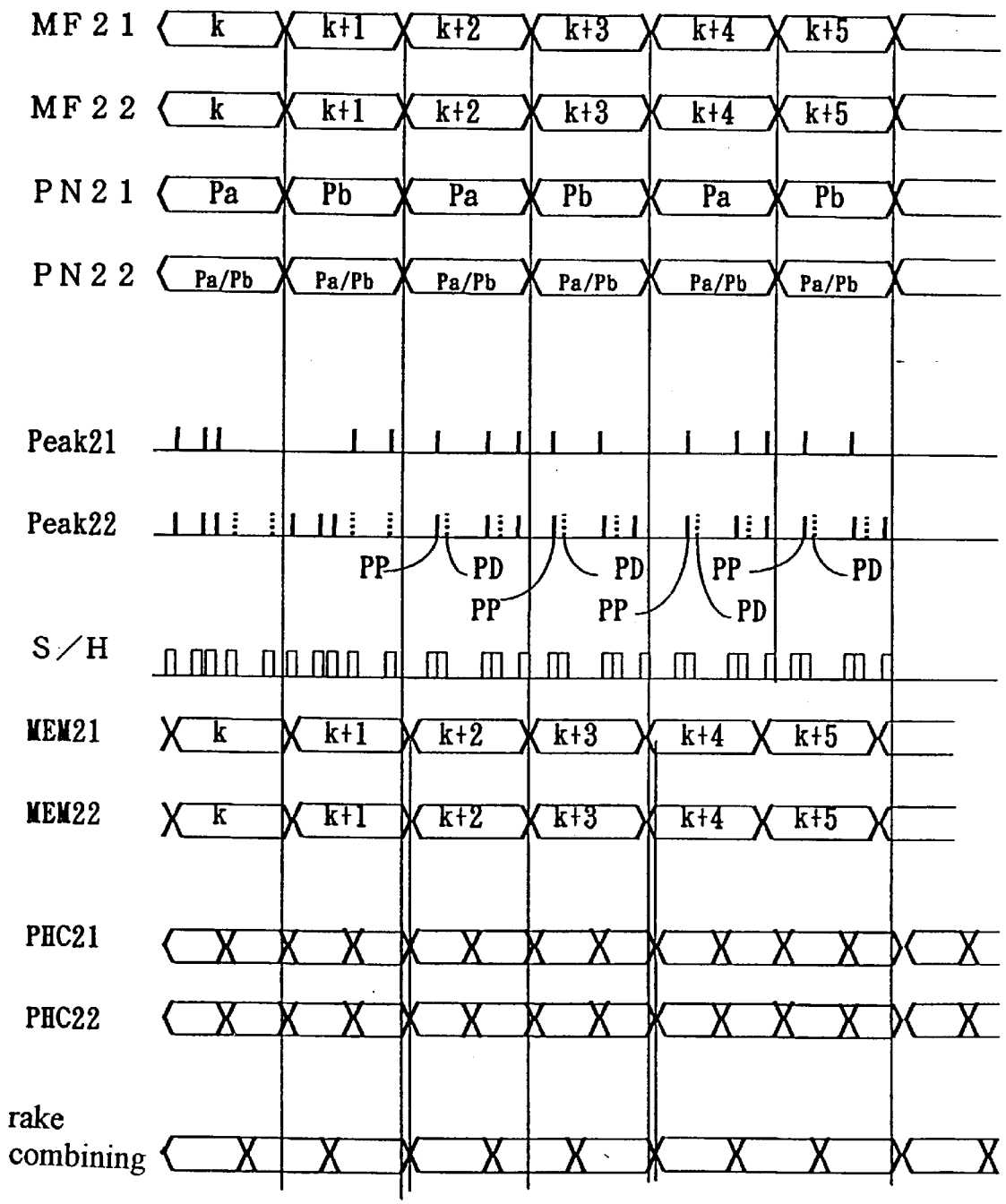
Figure 8:
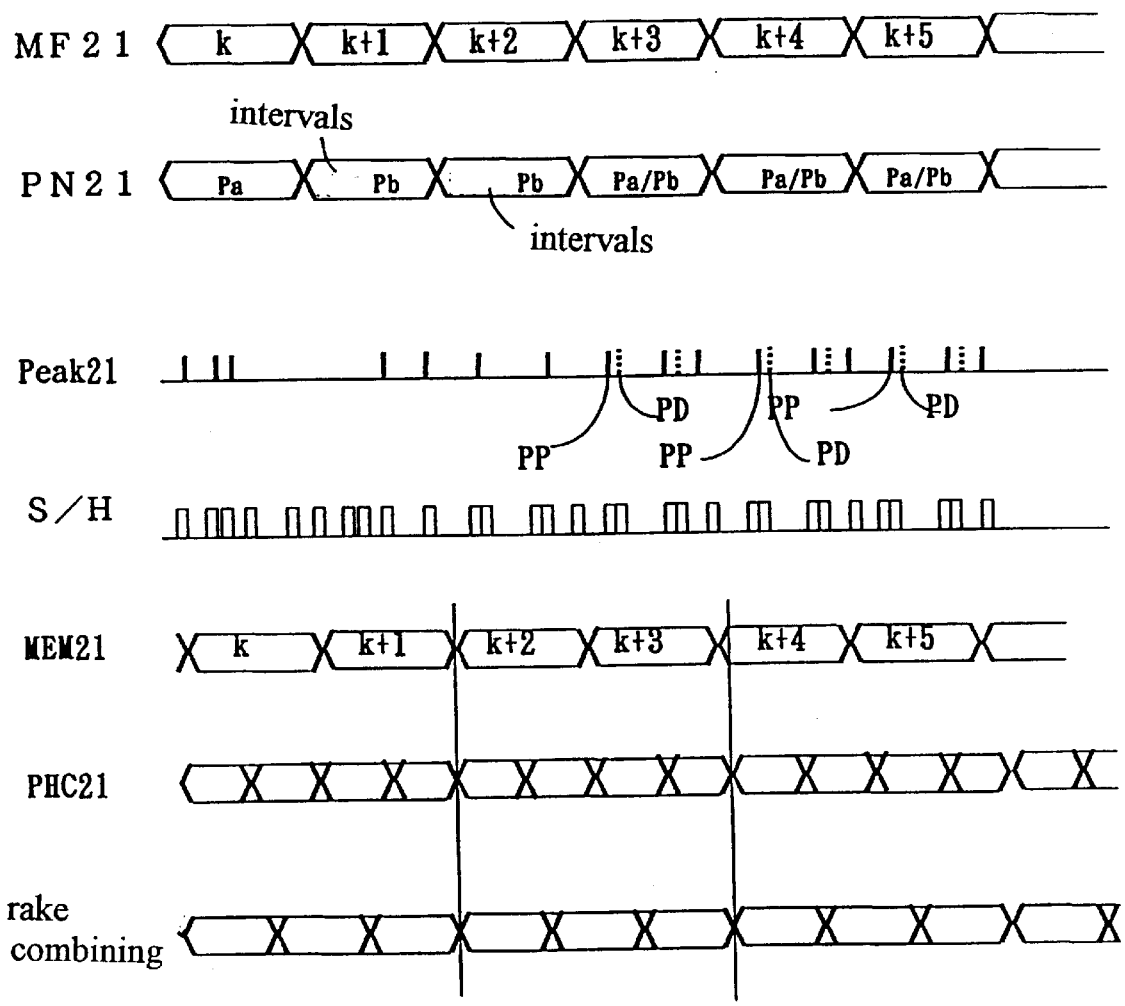
Figure 9:
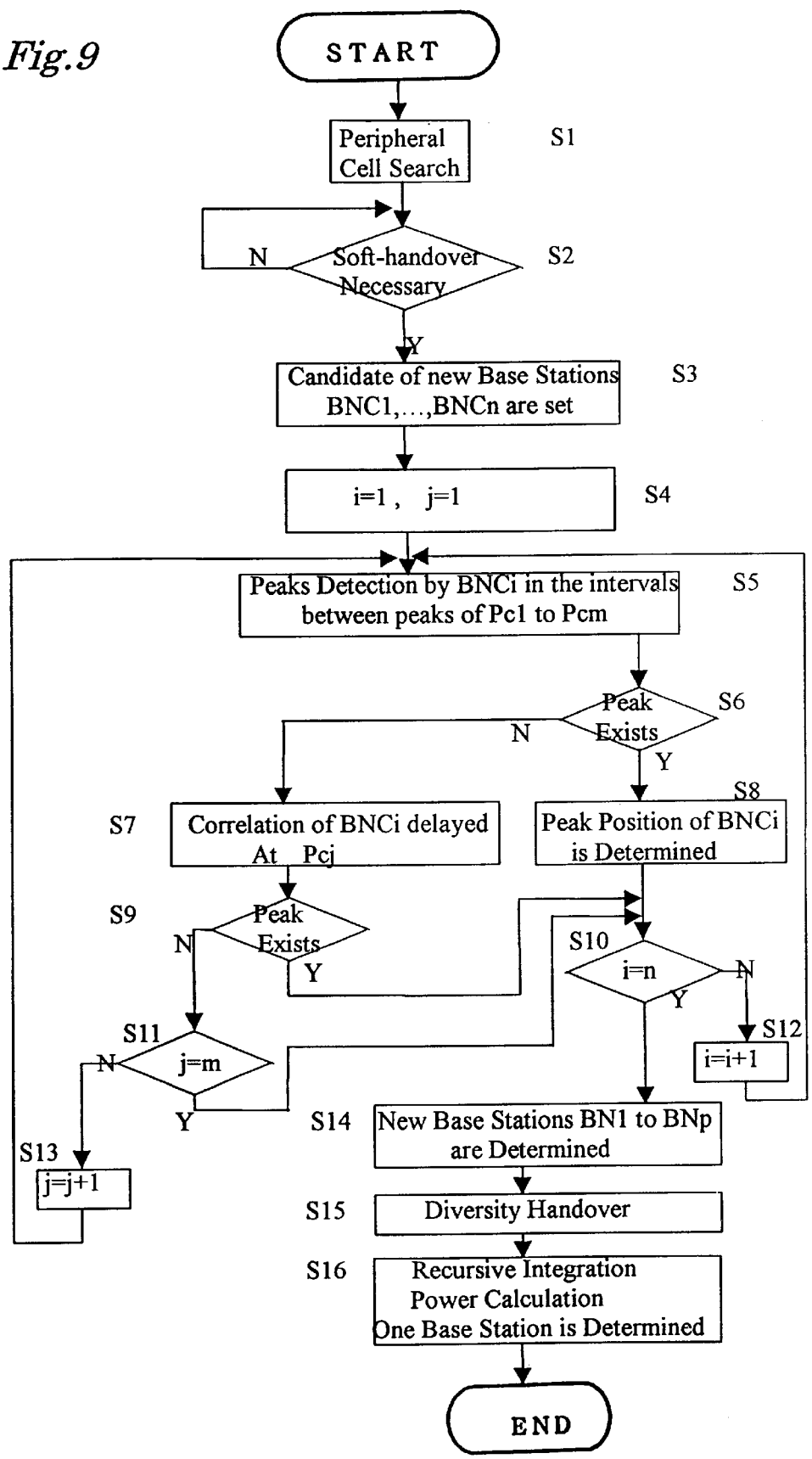
Figure 10:
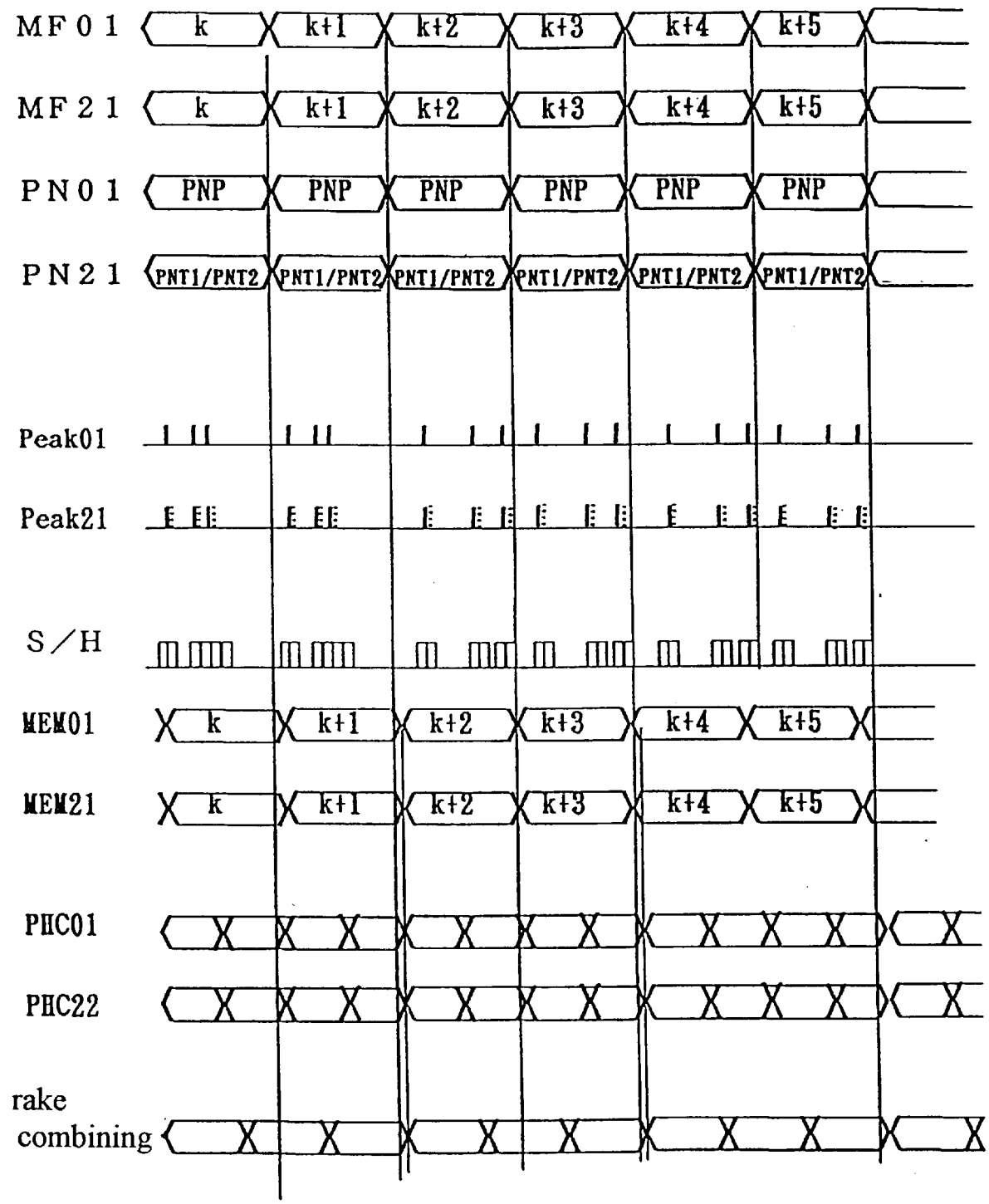
Figure 11:
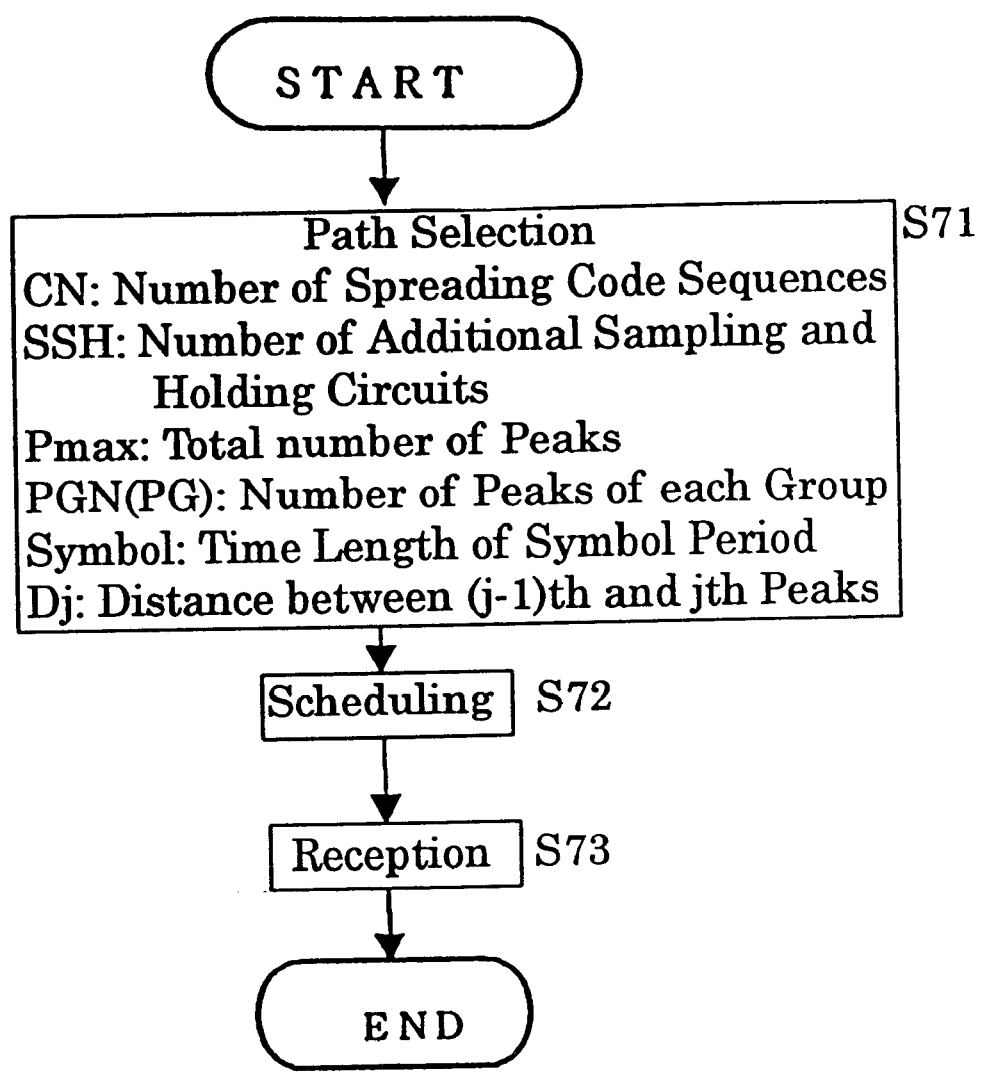
Figure 12:
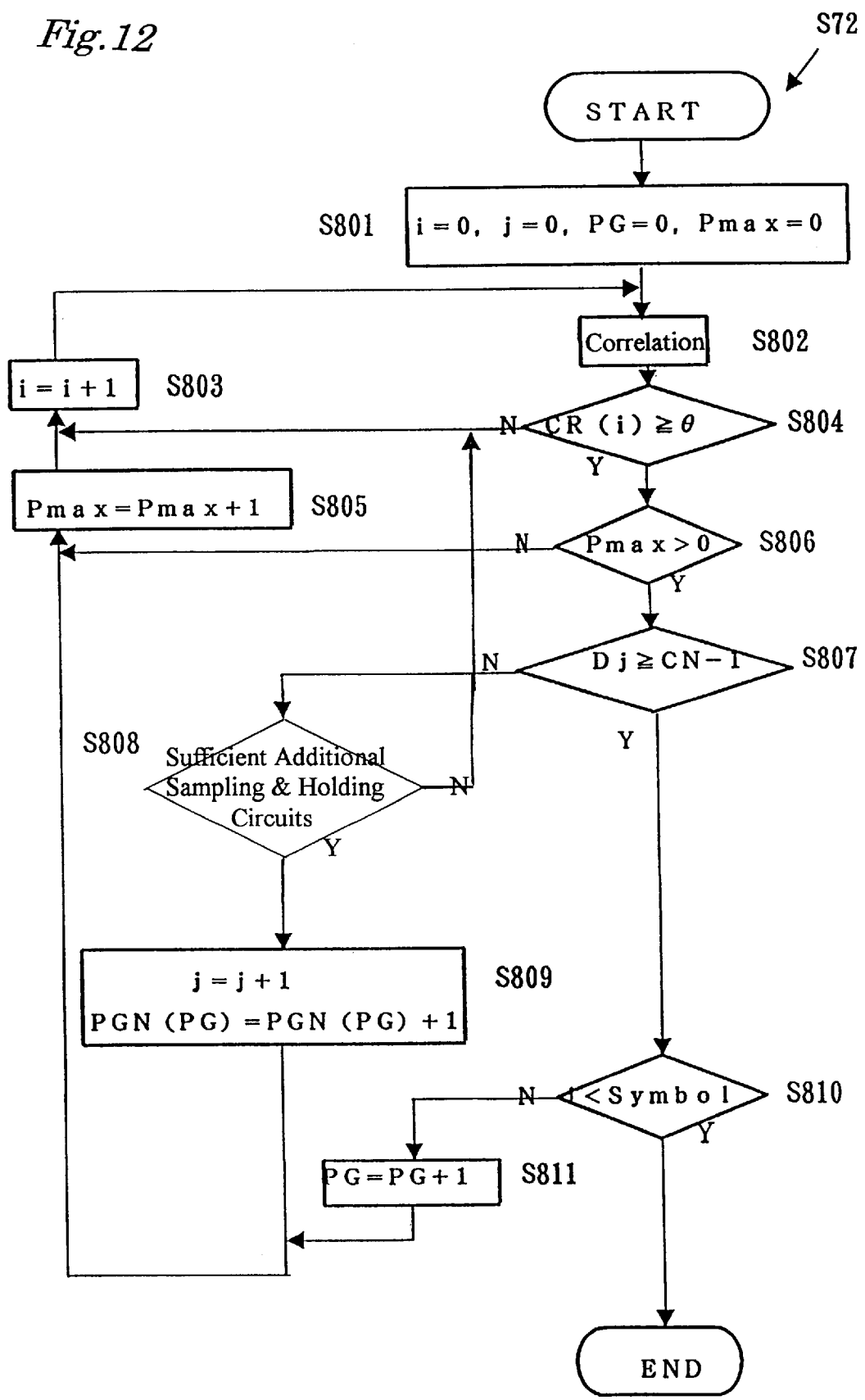
Figure 13:
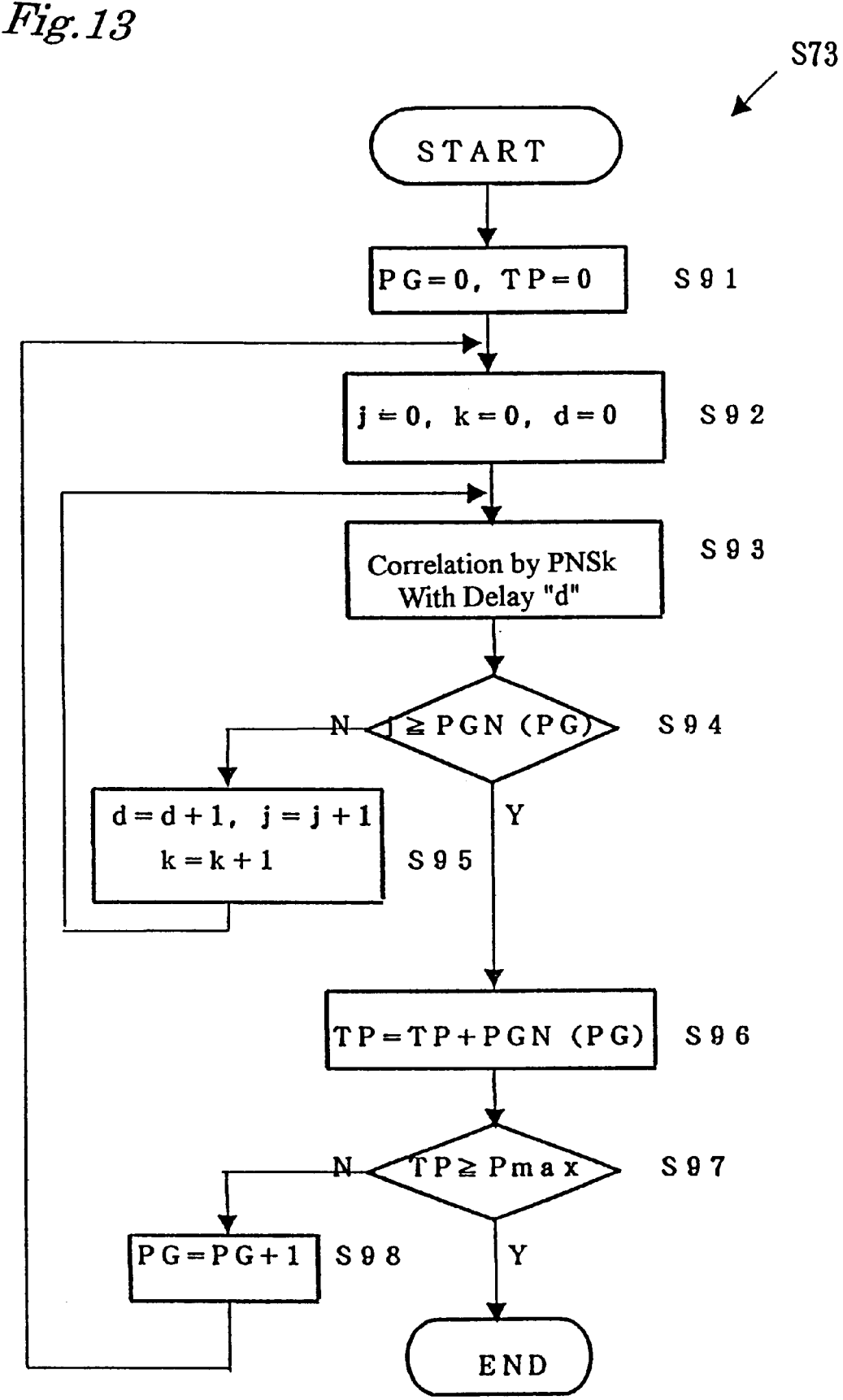
Figure 14:
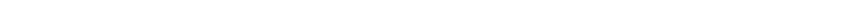
Figure 14:
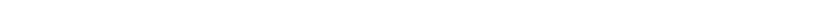
Figure 15:
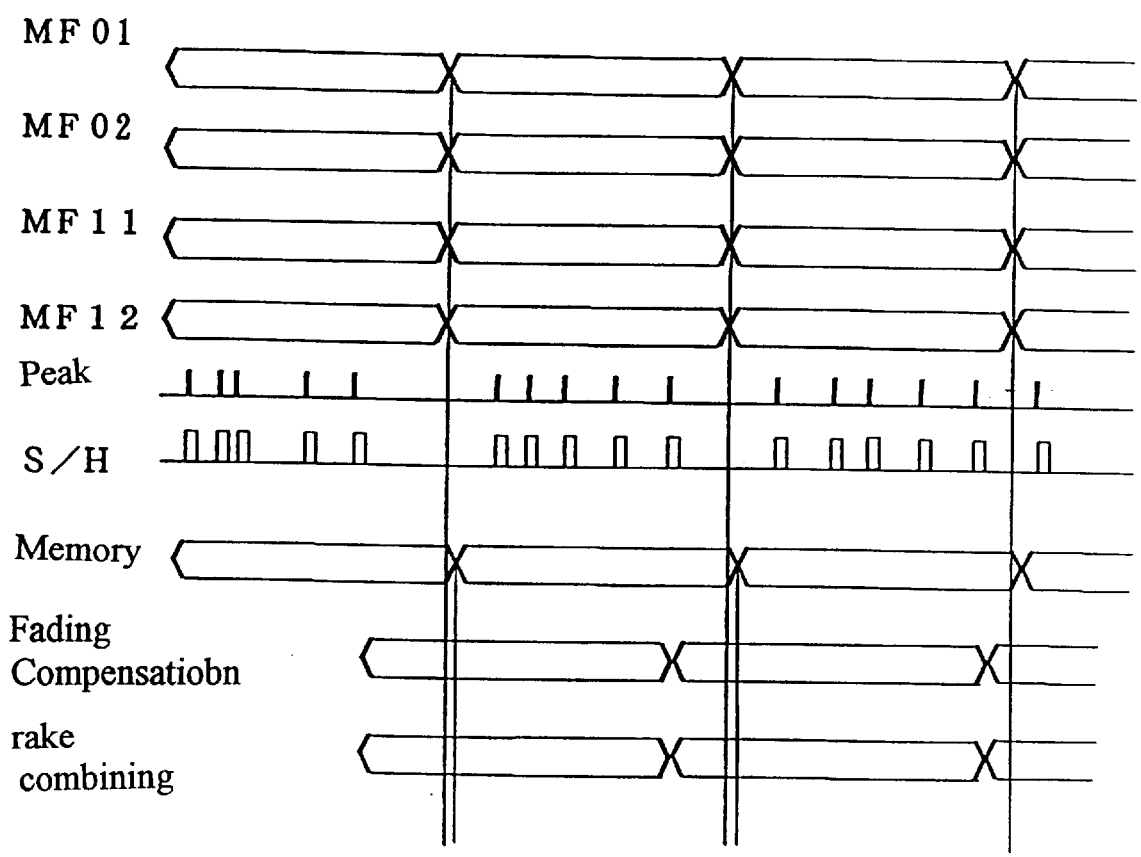
Figure 16:
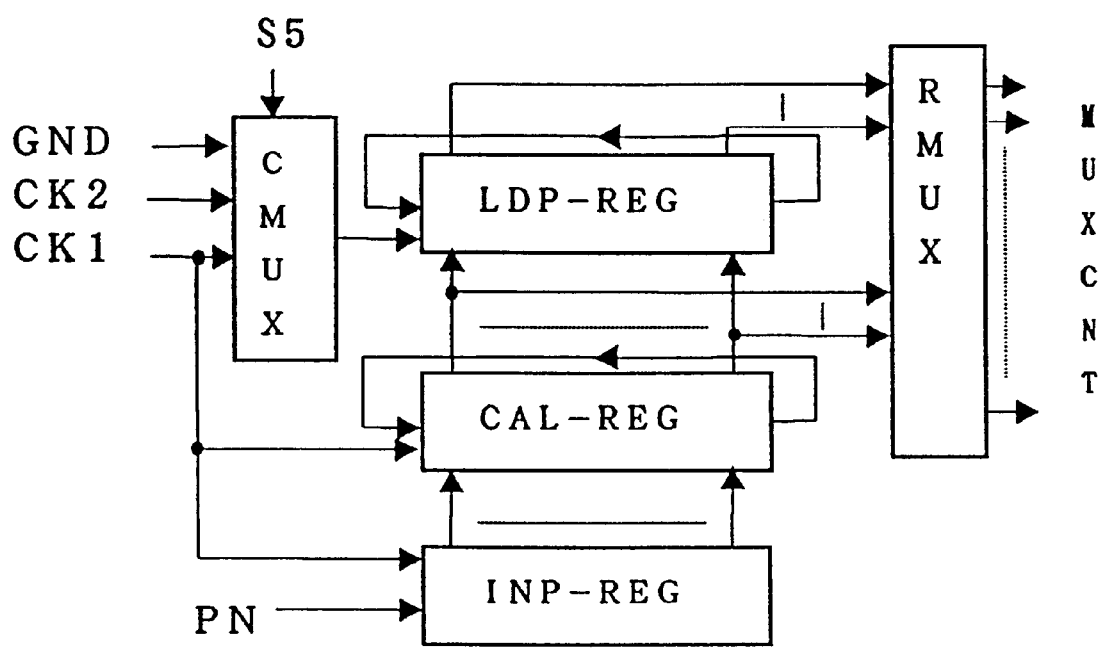
Figure 17:
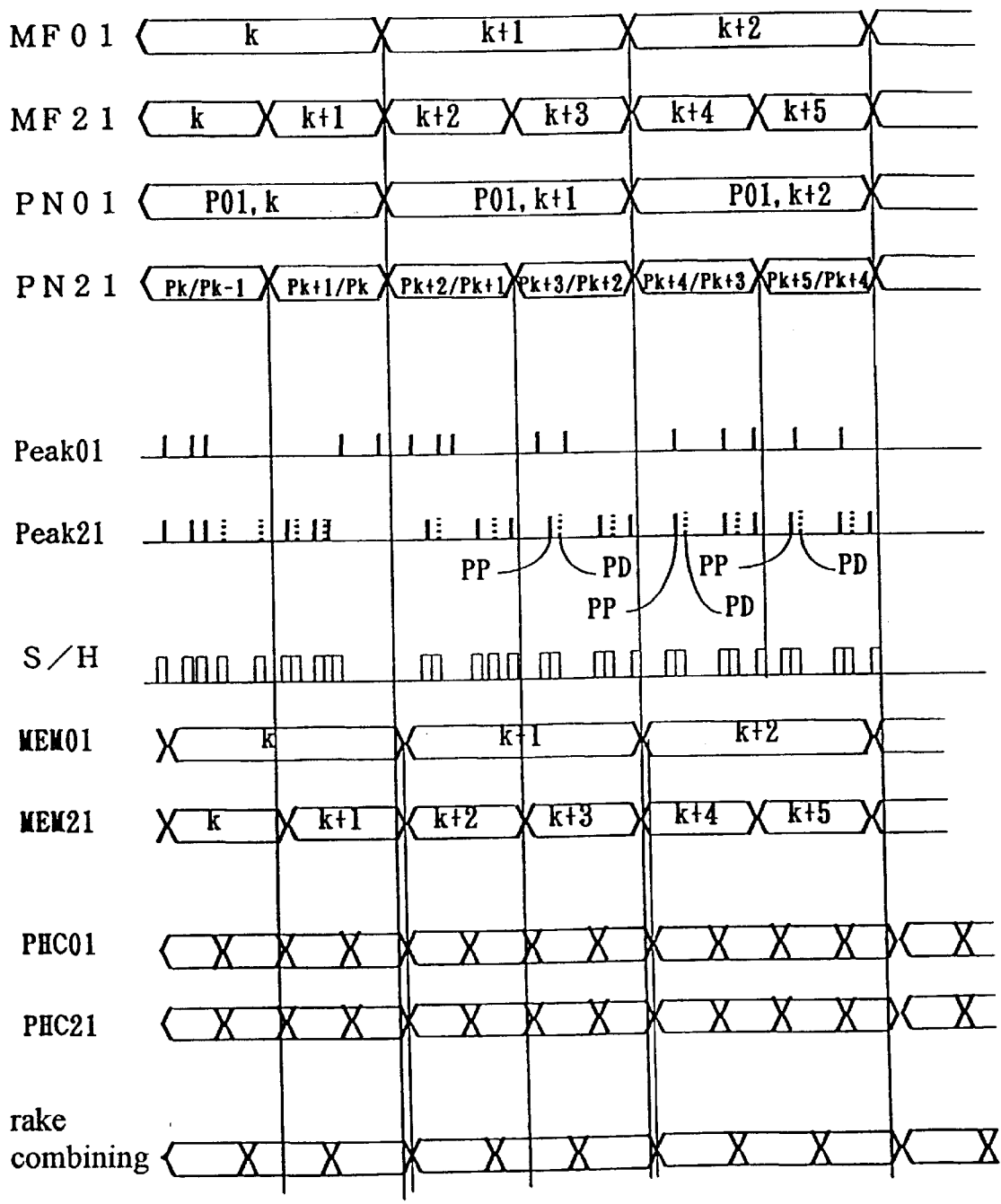
Figure 18:
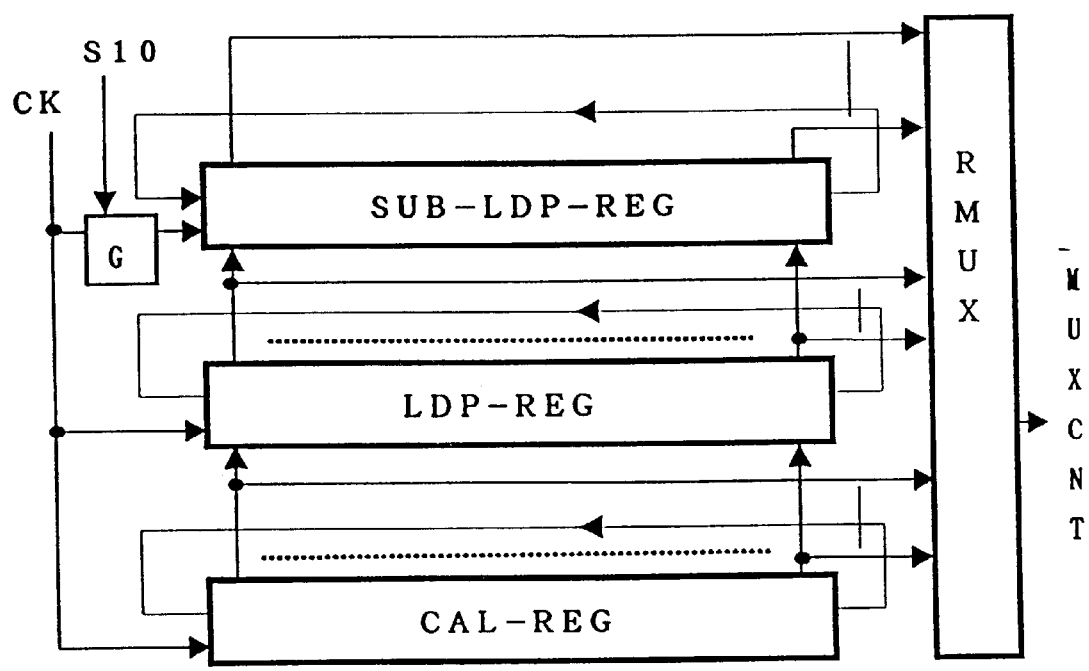
Figure 19:
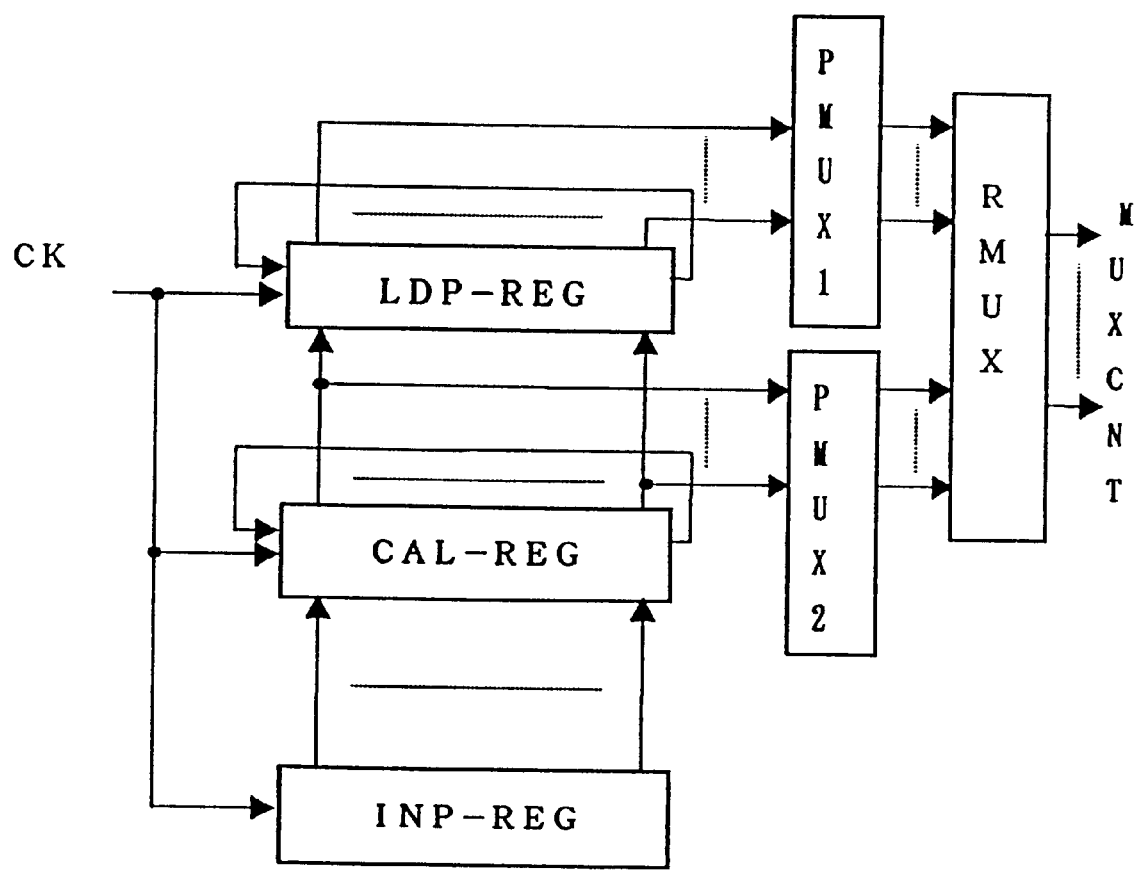
Figure 20:
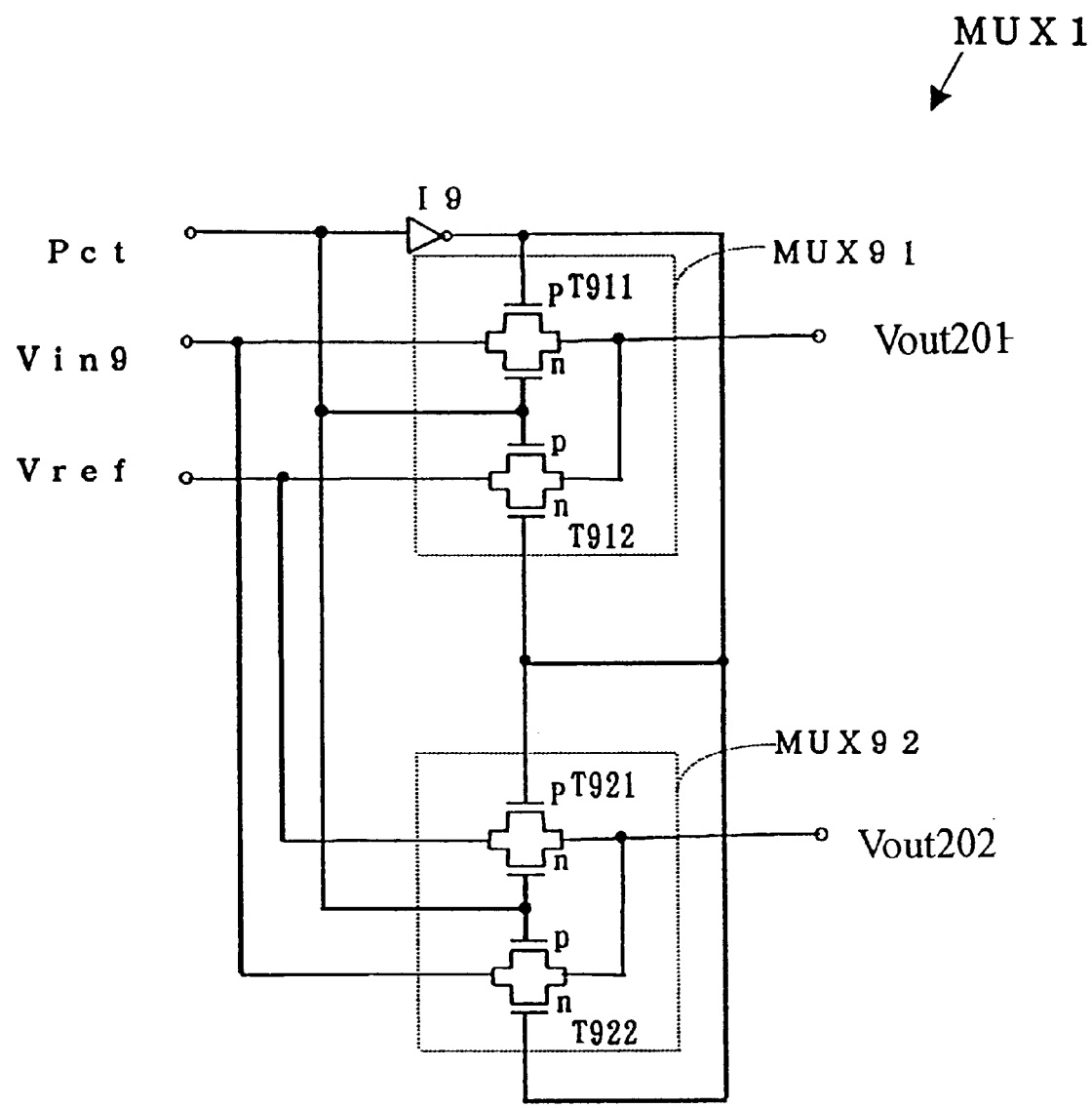
Figure 21:
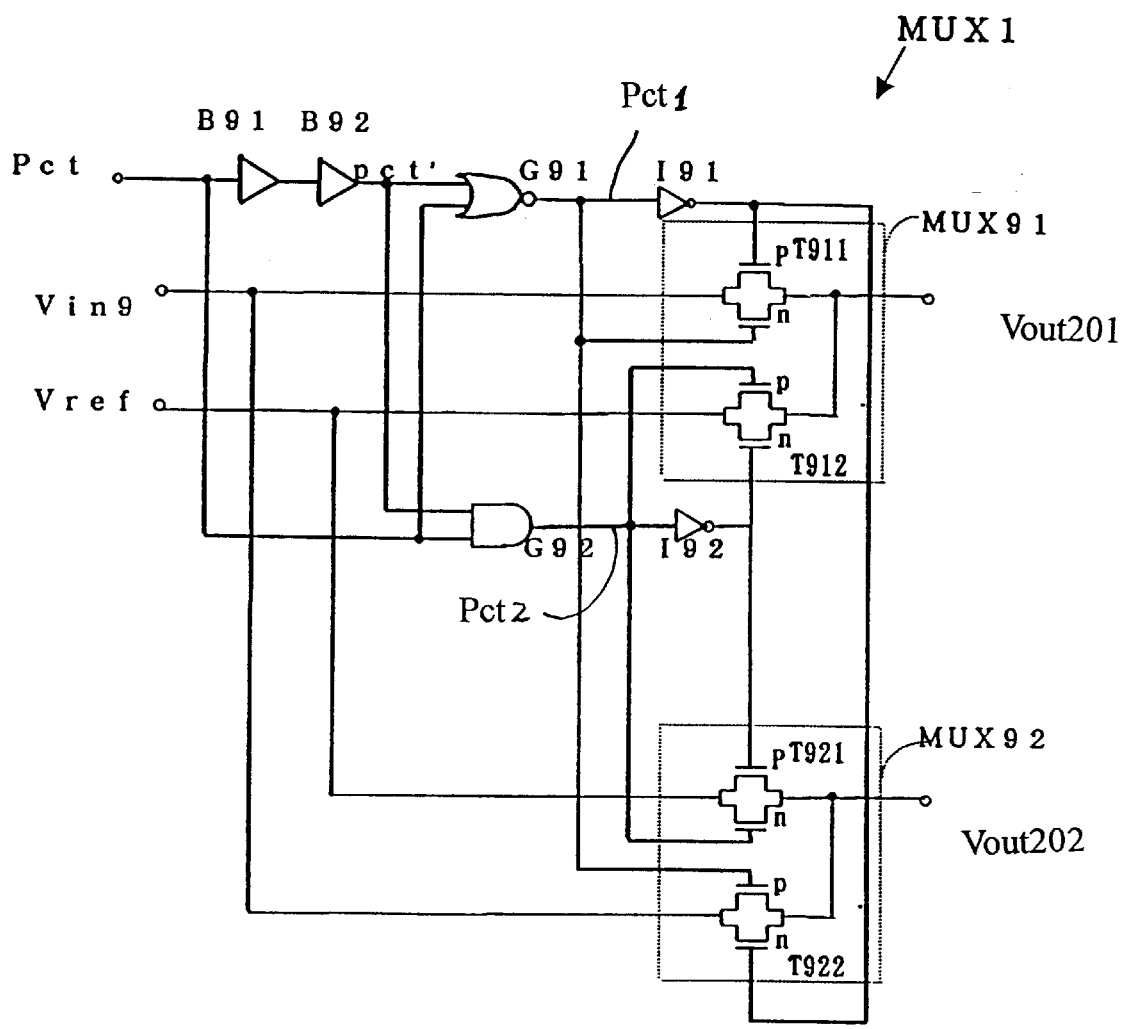
Figure 22:
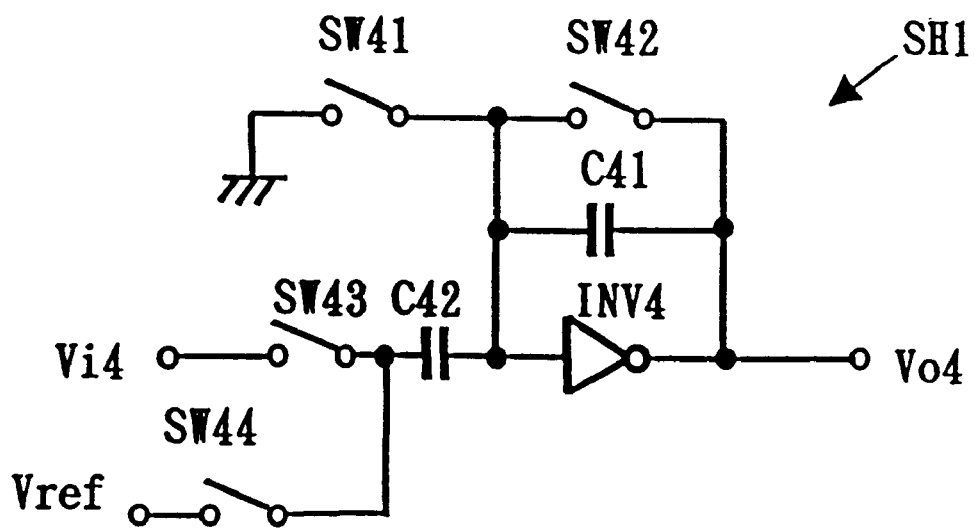
Figure 23:
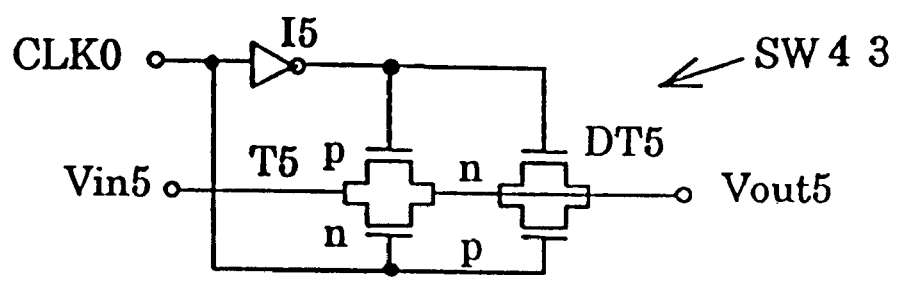
Figure 24:
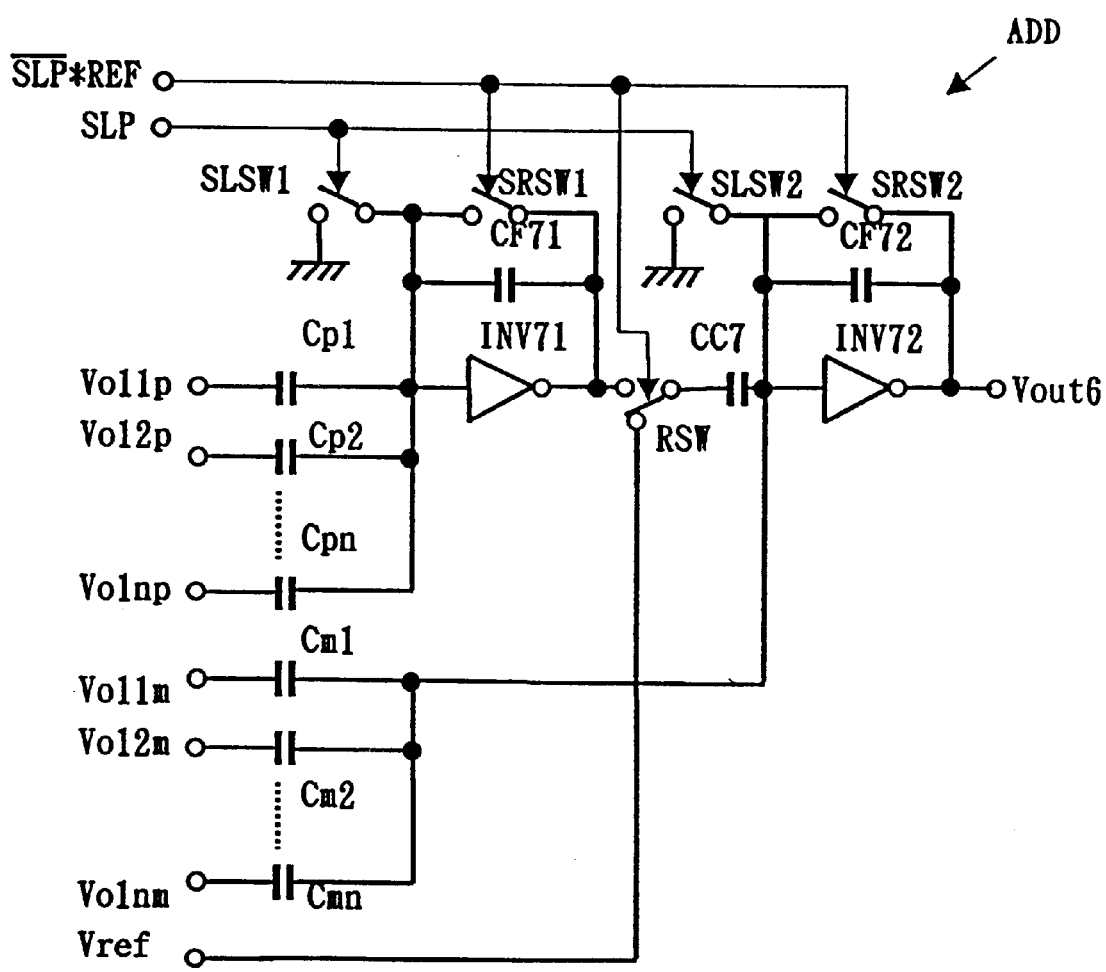

FIG. 1 is a block diagram of a matched filter in a signal reception apparatus for the DS-CDMA cellular system, FIG. 2 is a block diagram of a register for storing a plurality of spreading code sequences, FIG. 3 is a block diagram of a phase-multi-plexer in FIG. 2, FIG. 4 is a timing chart of the matched filter for receiving signals from a plurality of base stations, FIG. 5 is a block diagram of another matched filter, FIG. 6 is a circuit diagram of the circuit following to the matched filter, FIG. 7 is a timing chart of the matched filter for another processing, FIG. 8 is a timing chart of the matched filter for further another processing, FIG. 9 is a flow chart of the processing of FIG. 8, FIG. 10 is a timing chart of the matched filter for multi-code processing, FIG. 11 is a flow chart of the processing of FIG. 10, FIG. 12 is a flow chart of schedule determination in FIG. 11, FIG. 13 is a flow chart of receiving in FIG. 10, FIG. 14 is a timing chart of the matched filter for another multi-code processing, FIG. 15 is a timing chart of the matched filter for long-delay processing when a log-delay does not occur, FIG. 16 is a block diagram of a register for storing a spreading code for long-delay, FIG. 17 is a timing chart of the matched filter for long-delay processing when a log-delay occurs, FIG. 18 is a block diagram of another register for storing a spreading code for long-delay, FIG. 19 is a block diagram of further another register for storing a spreading code for long-delay, FIG. 20 is a circuit diagram of a multi-plexer in FIG. 1, FIG. 21 is a circuit diagram of another multi-plexer in FIG. 1, FIG. 22 is a circuit diagram of a sampling and holding circuit in FIG. 1, FIG. 23 is a circuit diagram of a switch in FIG. 1, and FIG. 24 is a circuit diagram of an adder in FIG. 1,

PREFERRED EMBODIMENT

Hereinafter, preferred embodiments of a signal reception apparatus for DS-CDMA cellular system according to the present invention are described with reference to the attached drawings.

In FIG. 1, one of matched filters in a signal reception apparatus includes a plurality of sampling and holding circuits SH1 to SHn parallelly connected to an analog input signal Vin. The sampling and holding circuits are controlled by a system clock so as to successively hold the signal Vin in response to the system clock. Since the data held by one sampling and holding circuit is not transferred to another sampling and holding circuit, a transfer error is prevented.

Outputs of the sampling and holding circuits are input to corresponding multi-plexers MUX1 to MUXn of one input and two outputs. Each multi-plexer alternatively outputs the input to one of two outputs in response to a spreading code of one bit. The output of the outputs of each multi-plexers are input to a plus terminal "p" and a minus terminal "m" of an adder ADD. The terminals "p" and "m" are selected in response to "1" and "0" of the spreading code, and the adder has circuits for plus operation and minus operation. An output of the adder ADD is input to a scaling circuit SCALER for scaling the output of the adder to be an adequate level. An output Vout is generated after the scaling.

The sampling and holding circuits SH1 to SHn hold the input signal successively and circulatively, that is, SH1, SH2, ..., SHn, then from SH1 to SHn, repeatedly. A spreading code sequence including the spreading codes for the muti-plexers MUX1 to MUXn is circulated so that the relationship between the order of the input signals from the oldest to the newest and the spreading codes is not changed. The multi-plexers MUX1 to MUXn are quickly switched in response to the circulated spreading codes.

There are provided a plurality of matched filters MF01, MF02, MF11, MF12, MF21, MF22, MF23 and MF24 as shown in FIG. 6. Circuits following to, that is, connected to the outputs of the matched filters are shown in FIG. 6. The number of the matched filters is eight in FIG. 6, however, the number can be changed. Among eight matched filters, MF01 and MF02 are allocated to a perch channel group Pch, MF21 to MF24 are to a traffic channel group Tch, and MF11 and MF12 are to a common group Cch.

The four matched filters of the groups Pch and Cch are connected to a four-inputs-one-output multi-plexers MUXp1 to MUXpS each of which selectively output one of the outputs of the four matched filters. The multi-plexers MUXp1 to MUXpS are connected at their outputs to multipath-signal sampling and holding circuits SHp1 to SHpS, respectively. Each sampling and holding circuit holds one of peaks in the channel Pch and Cch.

The matched filters of the groups Tch and Cch are connected to six-inputs-one-output multi-plexers MUXt1 to MUXtR each of which selectively output one of the outputs of the six matched filters. The multi-plexers MUXt1 to MUXtR are connected at their outputs to multi-path-signal sampling and holding circuits SHt1 to SHtR, respectively. Each sampling and holding circuit holds one of peaks in the channel Tch and Cch.

Outputs of the matched filters of the groups Pch, Tch and Cch are input to a peak detection circuits PDp and PDt. The peak detection circuit PDp detects correlation peaks of the perch channel and/or common channel connected to the circuit PDp and averages each of the peaks for a plurality of periods, then registers phase of higher peaks after sorting of power of the peaks. The peak detection circuit PDt detects correlation peaks of the traffic channel and/or common channel connected to the circuit PDt and averages each of the peaks for a plurality of periods, then registers phase of higher peaks after sorting of power of the peaks. The circuits PDp and PDt output control signals for the sampling and holding circuits SHp1 to SHpS and SHt1 to SHtR. The control signals from PDp and PDt are decoded by decoders DECp and DECt, respectively, into sampling signals for the sampling and holding circuits SHp1 to SHpS and SHt1 to SHtR, respectively. The peak detection is performed totally or partially for the matched filters.

The matched filters of common group Cch can be used for the perch channel or traffic channel, then the number of matched filters for the traffic channel can be changed from for to six. The number of matched filters for the perch channel can be changed from two to four. The communication manner is highly flexible by the variable channel number.

The sampling and holding circuits SHp1 to SHpS and SHt1 to SHtR are connected at their outputs to analog to digital (A/D) converters ADp1 to ADpS and ADt1 to ADtR, respectively. The A/D converters convert the outputs of the sampling and holding circuits into digital signals. ADp1 to ADpS output the digital signals to a multi-path-signal multi-plexer MUX31, and ADt1 to ADtR output the digital signal to a multi-path-signal multi-plexer MUX32. These multi-plexers output one of outputs from the connected A/D converters for the fading compensation and rake combining in the following circuits in time-sharing manner. The circuits for the fading compensation and rake combining are small due to the time-sharing. The A/D converters ADp1 to ADpS can be substituted by one A/D converter which is used in the time-sharing manner for converting outputs of the sampling and holding circuits SHp1 to SHpS into digital signals. The A/D converters ARt1 to ADtR can be similarly substituted by one A/D converter.

MUX31 outputs the correlation outputs as the converted output from the A/D converters of the perch channel to a memory MEM31 for registering the correlation outputs. An in-phase component (I-component) and a quadrature component (Q-component) of the correlation outputs are compensated by a fading compensation circuit PC31 and input to a rake combiner RCM31. The rake combiner RCM31 generates a rake combined output Sout1. MUX32 outputs the correlation peaks of the traffic channel to a memory MEM32 for registering the correlation outputs. An in-phase component (I-component) and a quadrature component (Q-component) of the correlation outputs are compensated by a fading compensation circuit PC32 and input to a rake combiner RCM32. The rake combiner RCM32 generates a rake combined output Sout2.

FIG. 4 is a timing chart of the circuit in FIG. 6. Only the processes of the perch channel by MF01 and of the traffic channel by MF21 are shown for easy understanding. When a multi-path signal "Peak01" of three peaks from a base station "a" is received by MF01 of the perch channel in a symbol period, three of the sampling and holding circuits SHp1 to SHpS are used for holding the signal. Here, a multi-path signal of two peaks from another base station "b" occurs. The matched filter MF21 of the traffic channel receives a signal "Peak21" of five peaks, the total peaks of the two base stations above. Five of the sampling and holding circuits SHt1 to SHtR are used for holding the signal. The sampled data in the perch channel is registered in the memory MEM31 as shown by MEM01, and the sampled data in the traffic channel is registered in the memory MEM32 as shown by MEM21. The fading compensation and rake combining are performed for the data registered.

Since the delay profile of the received signal is not so quickly changed, a delay profile of one symbol period is assumed as a delay profile of the next symbol period. The phase of the multi-path in the traffic channel can be predicted.

For the soft-handover, the signals from other peripheral base stations than the current base station are to be simultaneously received and evaluated until the next base station is determined. In FIG. 4, the signals from the base stations "a" and "b" are simultaneously received by the matched filter MF21 of the traffic channel. Different spreading code sequences are used for the base stations "a" and "b", so the spreading code sequence is switched to be changed for receiving signals from different base stations.

As shown in FIG. 2, the spreading code sequences are supplied to the matched filters through two calculation registers CAL-REG1 and CAL-REG2. Input registers INP-REG1 and INP-REG2 are connected to the registers CAL-REG1 and CAL-REG2, respectively. Different spreading code sequences Pa and Pb are input to the input registers INP-REG1 and INP-REG2, respectively, and transferred to the calculation registers CA-REG1 and CAL-REG2, respectively. CAL-REG1 and CAL-REG2 are shift registers and their last stages are connected to the first stages, respectively.

Data in the total stages of the registers CA-Reg1 and CAL-REG2 are parallelly input to phase-multi-plexers PMUX1 and PMUX2, respectively. PMUX1 and PMUX2 output the current data of CAL-Reg1 and CAL-REG2, respectively, or the data of one tip time before the current data of CAL-Reg1 and CAL-REG2, respectively, to a register-multi-plexer RMUX. The register-multi-plexer RMUX outputs alternatively the data from PMUX1 or PMUX2 as a data MUXCNT.

As shown in FIG. 3, the phase-multi-plexer PMUX1 includes a data-multi-plexer DMUX1 receiving data D1 from the first stage and data D2 from the second stage, a data-multi-plexer DMUX2 receiving data and data D3 from the third stage, . . . , a data-multi-plexer DMUXn−1 receiving data Dn−1 from the (n−1)th stage and data Dn from the last nth stage, and a data-multi-plexer DMUXn receiving data Dn and D1 of CAL-REG1. It is possible that signals from different base stations have peaks at the same timing. These peaks have to be separated for one another. When there are no peaks overlapping (normal condition), PMUX1 outputs D1 to Dn as they are. When there are peaks overlapping at the same timing (overlapping condition), one of the two signals is shifted by one chip time. On the overlapping condition, PMUX1 output D2 to Dn and D1, respectively. These are the data of DMUX1 to DMUXn one chip time before. PMUX2 is similar to PMUX1, so the description therefor is neglected. If a multi-plexer of more than two inputs is used, more than two signals overlapping can be separated. Then, not only overlapped signals more than two but also two or more continuous overlapping of peaks can be separated.

As shown in FIG. 1, an additional sampling and holding circuit SHEX receiving the input signal Vin is provided besides sampling and holding circuits SH1 to SHn. A multi-plexer MUXEX is connected to an output of the sapling and holding circuit SHEX. An output of the multi-plexer MUXEX is input the "p" and "m" terminals of the adder ADD. In the case that the overlapping of peaks occurs just after SH1 samples Vin, this overlapping is predicted before one symbol period and the signal at the timing of the overlapping is held by both of the SHEX and the SH2. When the calculation of the data in SH1 and the spreading code sequence in CAL-REG1 is finished, next the calculation of the same data the spreading code sequence CAL-REG2 is performed using data in the SHEX not in the SH2, because the data in the SH2 is newly input at this time.

If the sampling and holding circuit SHEX were not provided, the correlation calculation by the spreading code sequence in CAL-REG2 includes an error due to the renewal data of SH2. However, the error can be neglected when there are a great many taps (number of multiplications) as in the usual DS-CDMA system. Therefore, a system without SHEX can be practically applied.

The sampling of the input signal Vin to the SHEX can be performed at the timing when the overlapping occurs. Data in the sampling and holding circuits SH1 to SHn are not renewed until the timing the overlapping does not occur. In this system, it is unnecessary to predict the overlapping before one symbol timing.

The processing above is described with reference to FIG. 4. The matched filter MF01 of the perch channel applies the spreading code sequences P01,a and P01,b for the base stations "a" and "b" one after another. The correlation peaks of the signal from the base stations "a" and "b" are detected as shown by Peak01. In the traffic channel, the matched filter MF21 applies the spreading code sequences Pa and Pb one after another for every symbol periods. In the kth and (k+1)th periods, signal of the base stations "a" and "b" are received. Since the overlapping is not occurred in the kth and (k+1)th periods, the total correlation peaks are sampled by the sampling and holding circuits SHt1 to SHtR as shown by S/H in FIG. 4. After the (k+1)th period, the peaks overlapping of signals from base stations "a" and "b" occurs at the timing shown by "PP". The peak of "b" is delayed by one chip time so that a new peak "PD" is generated. Then, the overlapping is prevented. The sampling and holding circuits sample the correlation peaks generated as shown above. The correlation outputs from MF01 are stored in the memory MEM01, and the correlation outputs from MF21 are stored in the memory MEM21. Then, the fading compensation (PHC01 and PHC21) and the rake combining are performed. The more the additional sampling and holding circuits are, the more the continuous overlapping peaks can be processed. The calculation becomes more accurate. When the number of continuous overlapping peaks is "d", data before {(1 symbol period)−(1 chip time)}, data before {(1 symbol period)−(2 chip time)}, . . . , data before {(1 symbol period)−(d−1 chip time)} are successively stored so as to generate correlation peaks using the successive data.

As mentioned above, when the number of continuous overlapping peaks is small relative to the total taps, the additional sampling and holding circuits can be omitted. By alternating the registers CAL-REG1 and CAL-REG2 every chip time, the calculation error is at most an order of one input data.

A matched filter in FIG. 5 can be used. The sampling and holding circuits SHA1 to SHAn are serially connected for transferring data from SHA1, SHA2, . . . , SHAn, successively. The input signal Vin is input to SHA1and an additional sampling and holding circuit SHAEX is connected to an output of SHn. Each of the multi-plexers SMUX1 to SMUXn has two inputs and one output for receiving outputs of adjacent two sampling and holding circuits SHA1 and SHA2, SHA2 and SHA3, . . . , SHAn−2 and SHAn−1 and SHAn−1 and SHAn. The first multi-plexer SMUX1 outputs one of the outputs of SHA1 and SHA2, and the kth multi-plexer SMUXk outputs one of the outputs of SHAk and SHAk+1. The outputs of the multi-plexers SMUX1 to SMUXn are input to multi-plexers MUX1 to MUXn, respectively, which are similar to MUX1 to MUXn in FIG. 1. The outputs of each of multi-plexers MUX1 to MUXn are input to a plus terminal "p" and a minus terminal "m" of an adder ADD. An output of the adder ADD is input to a scaling circuit SCALER for scaling the output of the adder to be an adequate level. An output Vout is generated after the scaling. The multi-plexers MUX1 to MUXn are switched by spreading codes m1 to mn, respectively.

By the connection of SHA1 to SHAn with MUX1 to MUXn, respectively, the correlation peak is calculated of spreading code sequence in CAL-REG1. Then, the connection is shifted to the connection of SHA2 to SHAEX with MUX1 to MUXn, respectively, the correlation peak is calculated of spreading code sequence in CAL-REG2. The connection is then returned to the first.

Similarly to the above, the additional sampling and holding circuit SHAEX can be deleted if the number of taps is large, and a plurality of additional sampling and holding circuits can be provided for continuous overlapping peaks.

FIG. 7 shows the second embodiment wherein the process of the matched filter MF01 in the first embodiment is performed by the matched filter MF21, while the process of the matched filter MF21 in the first embodiment is performed by a matched filter MF22 in the traffic channel. MF21 applies the spreading code sequences Pa and Pb of the base stations "a" and "b" alternatively in every symbol periods, MF22 applies Pa and Pb for the correlation peaks to be generated. The processes thereafter are similar to those in the first embodiment, so the description therefor is omitted. As in the second embodiment, the soft-handover can be performed by only the matched filters of the traffic channel.

FIG. 8 shows the third embodiment. The soft-handover is performed only by one matched filter MF21 in the traffic channel. MF21 applies the spreading code sequence Pa at the kth symbol period. In the (k+1)th and (k+2)the symbol periods, the spreading code sequence Pb at the intervals between peaks by Pa. Then, the correlation peaks of both base stations can be detected. In the (k+3)th period, both spreading code sequences Pa and Pb are applied.

FIG. 9 is a flowchart of the processing in FIG. 8. At the step S1, the peripheral cell search is performed. When it is judged that the soft-handover is necessary according to the peripheral cell search at step S2, candidates BNC1 to BNCn of base stations are determined at step S3. A loop counter "i" is initialized at step S4. The correlation for BNCi is calculated at the intervals between adjacent peaks of the current base station at step S5. Here, peaks are assumed as Pc1 to Pcm. When a peak is detected (step S6), the position (phase) of the peak is registered at step S8. Even when no peak exists, there is a possibility that the peak overlapping occurs. The correlation timings of Pc1 to Pcm are delayed at step S7, the first peak detected is registered as a correlation peak of the base station BNCi. Then, by changing "i" successively (step S12), correlation peaks of other base stations are searched at step S5. When the peak search of the total base stations is finished (step S10), a new base stations BN1 to BNp are determined at step S14. After a diversity hand-over (step S15), recursive integration and electrical power calculation, one base station is determined at step S16.

As shown in FIG. 20, the multi-plexer MUX1 includes a pair of multi-plexers MUX91 and MUX92. The multi-plexer MUX91 includes a pair of CMOS switches T911 and T912 connected to an input voltage Vin9 and the reference voltage Vref, respectively. The multi-plexer MUX92 includes a pair of CMOS switches T912 and T922 connected to the input voltage Vin9 and the reference voltage Vref, respectively. MUX91 and MUX92 are controlled by a control signal Pct which is input to gates of nMOS of T911, pMOS of T912, nMOS of T921 and pMOS of T922. An inversion of Pct is generated by an inverter I9 to be input to gates of pMOS of T911, nMOS of T912, pMOS of T921 and nMOS of T922. When Pct is high level, an output Vout201 of MUX91 is Vin9 and an output Vout202 of MUX92 is Vref. When Pct is low level, the output Vout201 is Vref and the output Vout202 is Vin9. Other multi-plexers MUX2 to MUXn are similar to MUX1, so descriptions therefor are omitted.

FIG. 21 shows a variation of the multi-plexer MUX1. In FIG. 21, similar portions to those in FIG. 20 are designated by the same references. There are two control signals Pct1 and Pct2, the former controls the switches T911 and T922, and the latter controls the switches T912 and T921. The control signals Pct1 and Pct2 are generated by a pre-control signal Pct. Pct is delayed by two stages buffers B91 and B92 and input to a NOR-gate G91 so that Pct1 is generated. The output of the buffer is also input to an AND-gate G92 so that Pct2 is generated. The control signals Pct1 and Pct2 become low level without fail in the time distance from the trailing edge of Pct1 to the leading edge of Pct2 and in the time distance from the trailing edge of Pct2 to the leading edge of Pct1. It means that Vin9 and Vref are never simultaneously output. Even when the spreading codes are quickly switched the outputs of the multi-plexers are stable. The reference voltage Vref is not influences by unstable outputs of the multi-plexers.

In FIG. 22, the sampling and holding circuit SH1 includes a switch SW43 connected to an input signal Vi4 (corresponding to Vin in FIG. 1), an input capacitance C42 connected to the switch SW43, an inverting amplifier INV4 consisting of CMOS connected to the input capacitance C42 and a feedback capacitance C41 for connecting an output of the inverting amplifier INV4 to its input. When the switch SW43 is changed from closed to opened, Vi4 (Vin) is held. A refresh switch SW42 is connected to INV4 parallelly to C41, and a refresh switch SW44 is connected to C42 for connecting a reference voltage to an input of SW44. The reference voltage is equal to a threshold voltage of INV4, and the input of INV4 is substantially the threshold voltage constantly. When SW42 is closed, the opposite terminals of C42 become the equal voltage and an electrical charge of C42 is deleted. A switch SW41 connected to a ground is connected to the input of INV4. When SW41 is closed, INV4 is connected to the ground at the input so that a CMOS included in INV4 becomes saturated condition. The electrical power consumption is stopped. The other sampling and holding circuits are similar to SH1, so the description therefor is omitted.

While, the sampling and holding circuit SHA1 consists of two of the sampling and holding circuit in FIG. 22, which are serially connected through a switch. The description therefor is omitted.

As shown in FIG. 23, the switch SW43 includes a transistor circuit T5 having pMOS and nMOS parallelly connected to an input voltage Vin5. A dummy transistor circuit DT5 is connected to an output of the transistor circuit T5. The dummy transistor circuit DT5 includes pMOS and nMOS parallelly connected to output of the transistor circuit T5, inputs and outputs of pMOS and nMOS are short-circuited. A clock CLK0 is input to gates of nMOS of T5 and pMOS of DT5, and an inversion of CLK0 is input to gates of pMOS of T5 and nMOS of DT5. The inversion is generated by an inverter I5. The other switches are similar to SW43, so description therefor is omitted.

As shown in FIG. 24, the adder ADD includes capacitances Cp1 to Cpn and Cm1 to Cmn for the plus terminals "p" and minus terminals "m" in FIG. 1, respectively. Outputs of Cp1 to Cpn are commonly connected to an input of an inverting amplifier INV71. Outputs of Cm1 to Cmn are commonly connected to an input of an inverting amplifier inv72. An output of INV71 is connected through a feedback capacitance CF71 to its input. An output of INV72 is connected through a feedback capacitance CF72 to its input. The output of INV71 is connected through an intermediate capacitance CC7 to the input of INV72. The adder can perform addition and subtraction. When the capacity ratios of Cp1 to Cpn, Cm1 to Cmn, CC7, CF71 and CF72 are as in the formula (1), the output voltage Vout6 is given as in the formula (2).

$$Cm1 = Cm2 = \ldots = Cmn = Cp1 = Cp2 = \ldots = \qquad (1)$$
$$= Cpn = \frac{CF71}{n} = \frac{CC7}{n} = \frac{CF72}{n}$$

-continued $$V_{out4} - V_b = V_{dd} - \frac{\sum_{i=1}^{n} Vo lip - \sum_{i=1}^{n} Vo lim}{n} \quad (2)$$

FIG. 10 shows the second embodiment of the present invention for multi-code processing. In the perch channel, the received signal (control signal) is despread by the matched filter MF01 with a spreading code sequence PNP, while in the traffic channel, a multi-code despread by the matched filter MF21 with spreading code sequences PNT1 and PNT2 is performed. The matched filters MF01 and MF21 perform the path search and signal reception. When the spreading ratios of the perch channel and the traffic channel are equal to each other, the path patterns of both channels are equal as shown by Peak01 and Peak21 in FIG. 4. Peak01 shows the path pattern in the perch channel and Peak21 shows the path pattern in the traffic channel. Since the path pattern of the traffic channel is determined from the path pattern of the perch channel, the path search in the traffic channel can be neglected. Higher peaks are selected from the peaks detected in the traffic channel. When three peaks shown by solid lines in Peak21 of a multi-path signal are selected by the despread of MF21 with PNT1 in a symbol period, multi-path peaks by PNT2 shown by broken lines in Peak21. The peaks of PNT2 are separated by delaying the timing of the despread, then six peaks are generated. These peaks are sampled and held by six of the sampling and holding circuits SHt1 to SHtR as shown in S/H in FIG. 4. The sampled peaks are then stored in the memory MEM01. The fading compensation and rake combining are performed for the stored data. The processing by MF01 in the perch channel is similar to the above, so the description therefor is omitted.

FIG. 14 shows another embodiment of the multi-code processing. Only one matched filter MF21 is used for the processing of two spreading code sequences PNt1 and PNt2. The output of the matched filters are used as an information signals after stored for a predetermined time length as mentioned above. It is possible to calculate the electrical power from the output and to perform path search from the power. It is also possible to change the process in response to change in the path pattern. The correlation peaks are held by some of the sampling and holding circuits SHt1 to SHtR and stored in the memory MEM21 similarly of the above.

FIGS. 11 to 13 are flowchart of the processing in FIG. 14. As shown in FIG. 11, the path pattern is determined from the path selection at step S71, then the reception schedule is determined at step 72. The signal is received according to this schedule at step S73. In scheduling, the number of the additional sampling and holding circuits, number of spreading code sequences and time length of one symbol period are judged. Here, the number of the additional sampling and holding circuits is SSH, the number of spreading code sequences is CN, time length of one symbol period is Symbol, the number of peaks is Pmax, time distances between adjacent peaks are Dj. A plurality of groups of peaks are defined, each consisting of peaks of distances Dj<(CN−1). Each group is defined by a number PG and the number of peaks consisted in each group is defined as PNG(PG).

As shown in FIG. 12, a timing number "i", a loop counter "j" of repetition for each group, the PG and the Pmax are initialized at step S801. A correlation is calculated by a spreading code PNS1 at the timing "i" (step S802). The correlation result is defined as CR(i). When CR(i) is equal to or higher than a predetermined threshold θ, it is judged that a correlation peak occurs at this timing (step S804). When this peak is the first detected (step S806), Pmax is increased by one (step S805). The timing "i" is also increased by one (step 803).

When two or more peaks are detected, the time distance Dj between each peak and the next peak ahead is evaluated (step S807). When Dj is equal to or longer than (CN−1) and the timing is not at the end of the symbol period (step S810), this peak is classified in to another group than a group including peaks before the peak (step S811). When Dj is smaller than (CN−1), it is judged whether the number of the additional sampling and holding circuits is sufficient for processing the peaks as one group or not (step S808). If possible, the counter "j" and the number of peaks PNG(PG) in the group are increased by one. When the number of the additional sampling and holding circuits is insufficient, the timing "i" is increased by one (step S803) and the next correlation is calculated step (S802). Correlation peaks in one group are processed by holding signals in the additional sampling and holding circuits so that the same signal is processed by different spreading code sequences.

An evaluation of the formula (3) is performed (step S808). If SSH is bigger than the right side in the formula (3), the peaks are processed. While if SSH is not bigger, peaks of a number TP not bigger than SSH are processed and the rest of peaks are neglected.

$$SSH \geq (CN - 1) \cdot j - \sum_{j=1}^{PGN(PG)-1} D_j \quad (3)$$

As shown in FIG. 13, the numbers PG and TP are initialized (step S91) at the signal reception step S73. The counter "j", a number "k" of the spreading code and a delay time "d" are initialized (step S92). A correlation is calculated by a spreading code sequence PNSk at the delay time "d" (step S93). This process in continued until "j" reach PGN (PG) (step S94). When j is smaller than PGN(PG), d, j and k are increased by one and the correlation calculations are repeated. When j becomes equal to PGN(PG), TP is increased by PGN(PG) (step S96). If the TP does not reach Pmax, PG is increased by one so that a new group of peaks begins (steps S98 and S92).

FIG. 15 is a timing chart of the third embodiment of processing for long-delay signals. In a symbol period, matched filters MF01, MF02, MF11 and MF12 in the perch channel receive the signal. When five peaks of multi-path signal occurs as shown by Peaks in FIG. 15 in one of the matched filters, five of the sampling and holding circuits SHp1 to SHpS are used for sampling as shown by S/H. The sampled data are stored in the memory MEM31 as shown by "memory". Then, the fading compensation and rake combining are performed.

When a long-delay signals occurs in the traffic channel, that is, a multi-path signal including a signal delaying more than one symbol period, this delay signal can usually be detected in the perch channel because the symbol period of the perch channel is longer than, such as twice as long as, the symbol period of the traffic channel. If the symbol period of the perch channel is twice as long as the symbol period of the traffic channel, the peaks in the latter half of the symbol period of the perch channel are long-delay paths in the traffic channel. The delay profile is not steeply changed, the delay-profile is applied to the next symbol period. Therefore, the multi-path phase in the traffic channel can be predicted.

As shown in FIG. 16, the spreading code sequences are supplied to the matched filters from two sets of calculation registers CAL-REG and LDP-REG. The current spreading code sequence is stored in CAL-REG and a spreading code sequence one symbol period before the current sequence is stored in LDP-REG. Parallel outputs of CAL-REG and LDP-REG are input to a register-multi-plexer RMUX for alternatively outputting one of the parallel outputs as a control signal MUCCNT. The control signal MUXCNT are input to the multi-plexers MUX1 to MUXn in FIG. 1 for controlling them. Since a new spreading code sequence must be loaded into CAL-REG instantaneously just after the end of one symbol period, the new sequence is advantageously loaded into an input register INP-REG during the last symbol period. The sequence in INP-REG is parallelly transferred to CAL-REG. Just before the parallel transfer from INP-REG to CAL-REG. The sequence in CAL-REG is transferred to LDP-REG so that the sequence one symbol period before is stored in LDP-REG. The multi-plexer RMUX supplies the current spreading code sequence in CAL-REG to the matched filters for not long-delay signal and supplies the spreading code sequence one period before in LDP-REG to the matched filter for the long-delay signal. Therefore, long-delay path can be detected by one matched filter. The circuit of the signal reception apparatus is small. When two or more long-delay registers LDP-REG are used, signals delaying by two symbol periods or more can be detected.

It is possible that a multi-path and long-delay path occurs at the same time in one matched filter. The long-delay register receives clocks CK1, CK2 and a ground voltage GND at its clock input through a multi-plexer CMUX. CK1 is synchronous to the sampling timing of the sampling and holding circuits, and CK2 is a clock much quicker than, such as four times as, CK1. At the timing when the correlation peaks occurs simultaneously, the current spreading code sequence in CAL-REG is supplied through RMUX to the matched filters and the spreading code sequence in LDP-REG is not used. At this time, CMUX is changed to GND so that the circulated shifting of LDP-REG is stopped. At the next timing, LDP-REG is selected so that the correlation is calculated by the sequence in LDP-REG one symbol period later. The overlapping peaks are separated and detected.

As shown in FIG. 17, the matched filter MF01 in the perch channel has finished kth correlation calculation and simultaneously the matched filter MH21 in the traffic channel has finished the kth and (k+1)th correlation calculation. The spreading code sequences PN01 and PN21 are applied to the matched filters MF01 and MF21, respectively. In the kth period, a spreading code P01,k of PN01 is applied to MF01 in the perch channel. In the kth and (k+1)th periods, spreading codes Pk and Pk+1 of PN21 are applied to MF21 in the traffic channel.

When correlation peaks occur in the kth period as shown in Peak01, the peaks in the latter half of the kth period are long-delaying paths. Peaks in the traffic channel corresponding to these long-delaying paths of the perch channel are shown by broken lines in the kth period in Peaks21. In the kth period, there no peak overlapping, so the total peaks are held by the sampling and holding circuits SHt1 to SHtR following to the matched filters as shown in S/H. The long-delay path can be detected by this process. In the (k+3)th period of MF21, the peak overlapping occurs by the current spreading code and the log-delay spreading code at the timing shown by PP in Peaks21. The long-delay correlation is delayed as mentioned above, the long-delay peaks are generated in a delayed timing as shown by PD, then the overlapping is prevented. The sampling and holding circuits hold the peaks above. The correlation outputs of MF01 and MF21 are stored in the memories MEM01 and MF21, respectively. Similarly to the process in FIG. 15, the fading compensation (PHC01 and PHC21) and rake combining are executed.

The more the additional sampling and holding circuits are, the more the continuous overlapping peaks can be processed. The calculation becomes more accurate. When the number of continuous overlapping peaks is "d", data before {(1 symbol period)–(1 chip time)}, data before {(1 symbol period)–(2 chip time)}, . . . , data before {(1 symbol period)–(d–1 chip time)} are successively stored so as to generate correlation peaks of long-delay paths using the successive data. Then, (d+1) times circulated shifting is quickly performed for LDP-REG within on chip time so as to return LDP-REG to the condition if the shifting were not stopped.

In FIG. 18, another circuit for long-delay path is shown. In the figure, similar portions to those in FIG. 16 is designated by the same references. A sub-long-delay register SUB-LDP-REG is provided for storing the same spreading code sequence as that in LDP-REG, with shifted to be delayed by one time than that in LDP-REG. Instead of the stop of shifting in the circuit of FIG. 16, RMUX is switched to SUB-LDP-REG for outputting the spreading code delayed by one chip time. This is equivalent to the process by the stop of the shifting. Then RMUX is returned to LDP-REG so that the process is returned to the condition of no peak overlapping. A clock CK is input through a gate G to SUB-LDP-REG. The clock can be stopped by G during one chip time. Then, the circulated shifting is delayed by one chip time. This circuit does not need high speed clock used in the circuit of FIG. 16. This circuit is advantageous for rather low speed circuit and the circuit size is small.

When a plurality of peak-overlappings occur continuously, a plurality of sub-long-delay registers SUB-LDP-REG successively delayed by one chip time are used. The number of SUB-LDP-REG is equal to the number of peak-overlappings. Similarly to the circuit of FIG. 16, by using CAL-REG and LDP-REG one after another, only one SUB-LDP-REG and only one SHEX are necessary.

FIG. 19 shows further another circuit for log-delay path. In the figure, similar portions to those in FIG. 16 is designated by the same references. One clock CK is commonly input to INP-REG, CAL-REG and LDP-REG. The stages of CAL-REG and LDP-REG are fed back to their first stages. The data in LDP-REG are input to a phase-multi-plexer PMUX1and the data in CAL-REG are input to a phase-multi-plexer PMUX2. PMUX1 and PMUX2 output the data in LDP-REG and CAL-REG as they are or delayed by one chip time. Outputs of PMUX1 and PMUX2 are input to a register multi-plexer RMUX which alternatively outputs the outputs of CAL-REG or LDP-REG.

What is claimed is:

1. A signal reception apparatus for direct sequence code division multiple access (DS-CDMA) cellular system comprising:
  a set of a plurality of sampling and holding circuits for holding an input signal successively input:
  a plurality of matched filters each for calculating a correlation every predetermined periods (symbol periods) between said input signal held by said sampling and holding circuits and a spreading code sequence, said spreading code sequence being a sequence of composite code of a long code indicating a base station and a short code indicating a mobile station;

a plurality of calculation registers for supplying said spreading code sequences to said matched filters, said calculation registers being classified into a plurality of groups corresponding to said matched filters, each said group including one or more of said calculation registers; and a multi-plexer means provided for said groups including a plurality of calculation registers for selectively connecting one of said calculating registers in each said group to said corresponding matched filter.

2. A signal reception apparatus as claimed in claim 1, wherein said set of sampling and holding circuits are parallelly connected to said input signal and are controlled so that said input signal is held by said sampling and holding circuits one after another on every chip time, and said spreading code sequences are circulatively shifted in said calculation registers synchronous to said sampling timing.

3. A signal reception apparatus as claimed in claim 2, wherein said set of sampling and holding circuits comprises sampling and holding circuits serially connected from a first stage to a last stage and said spreading code sequence is transferred in a direction from said first stage to said last stage.

4. A signal reception apparatus as claimed in claim 2, further comprising a phase-multi-plexer connected between said calculation registers and said multi-plexer means for selectively outputting said spreading code sequence of a shifting condition at that time or of a shifting condition before said condition, whereby said spreading code sequences of different calculation registers at a same timing are successively supplied to said matched filter so that correlation peaks at a same time by different spreading code sequences are separately generated.

5. A signal reception apparatus as claimed in claim 2, further comprising one or more additional sampling and holding circuits for holding said input signal at a timing of {(one symbol period)–(one chip time)} before a time when correlation peaks occur by different spreading code sequences and at intervals of (one chip time) before and from said timing of {(one symbol period)–(one chip time)} before said timing.

6. A signal reception apparatus as claimed in claim 2, further comprising one or more additional sampling and holding circuits for holding said input signal at a time when correlation peaks occur by different spreading code sequences and at timings at intervals of (one chip time) after and from said time.

7. A signal reception apparatus as claimed in claim 1, wherein one of said matched filters is allocated to a perch channel and one to a traffic channel and said matched filter allocated to said perch channel performs a path search for finding a timing when said matched filter allocated to said traffic channel is to calculate correlation.

8. A signal reception apparatus as claimed in claim 1, wherein one of said matched filters is allocated to a traffic channel which performs a path search for finding a timing to calculate correlation by changing said spreading code sequences every said symbol periods, thereafter performs correlation calculation by itself.

9. A signal reception apparatus as claimed in claim 1, further comprising a selector means connected between said sampling and holding circuits and said calculation register for keeping a relationship between said sampling and holding circuits and said spreading code sequence in said calculation register unchanged, said multi-plexer means being switched for calculating correlation by different spreading code sequences with input signal in said sampling and holding circuits with keeping said relationship between said sampling and holding circuits and said spreading code sequence in said calculation register unchanged, said selector means returned thereafter to a condition before keeping said relationship unchanged, whereby said peaks are separately generated.

10. A signal reception apparatus as claimed in claim 9, wherein, when said peaks by different spreading code sequences continuously occur at a plurality of timings, said selector means keeps said relationship between said sampling and holding circuits and said spreading code sequence in said calculation register unchanged during said plurality of timings, whereby said plurality of peaks separately generated.

11. A signal reception apparatus as claimed in claim 5, wherein, when a correlation peak occurs after a correlation peak in one symbol period and a time distance between said successive peaks is equal to or more than CN·Tt, where CN is a number of spreading code sequences and Tt is a chip time, said correlations by said total spreading code sequences are successively calculated during said time distance, and when a correlation peak occurs after a correlation peak in one symbol period and a time distance between said successive peaks is less than CN·Tt, said correlation by one of said spreading code sequence is calculated during said time distance and then correlations by other spreading codes are calculated thereafter.

12. A signal reception apparatus as claimed in any one from claims 1 to 11, wherein said plurality of calculation registers of one group hold spreading code sequences of a plurality of base stations for soft-handover.

13. A signal reception apparatus as claimed in any one from claims 1 to 12, wherein said plurality of calculation registers of one group hold a plurality of different spreading code sequences for multi-code processing.

14. A signal reception apparatus as claimed in any one from claims 1 to 11, wherein said plurality of calculation registers of one group hold a spreading code sequence with a delay within one symbol period and a spreading code sequence with a delay over one symbol period.

15. A signal reception apparatus as claimed in claim 14, wherein one or more of said symbol periods for one or more of said matched filters are longer than said symbol period for another of said matched filters, whereby said former can detect a correlation peak of said latter delayed more than said symbol period of said latter.

16. A signal reception apparatus as claimed in claim 15, wherein said former is allocated to a perch channel and said latter is allocated to a traffic channel.

* * * * *